US008356185B2

(12) United States Patent
Olson et al.

(10) Patent No.: US 8,356,185 B2
(45) Date of Patent: Jan. 15, 2013

(54) APPARATUS AND METHOD FOR LOCAL OPERAND BYPASSING FOR CRYPTOGRAPHIC INSTRUCTIONS

(75) Inventors: Christopher H. Olson, Austin, TX (US); Gregory F. Grohoski, Bee Cave, TX (US); Robert T. Golla, Round Rock, TX (US)

(73) Assignee: Oracle America, Inc., Redwood City, CA (US)

( * ) Notice: Subject to any disclaimer, the term of this patent is extended or adjusted under 35 U.S.C. 154(b) by 638 days.

(21) Appl. No.: 12/575,832

(22) Filed: Oct. 8, 2009

(65) Prior Publication Data

US 2011/0087895 A1    Apr. 14, 2011

(51) Int. Cl.
G06F 9/312    (2006.01)
G06F 21/00    (2006.01)
(52) U.S. Cl. .......................................... 713/189; 712/218
(58) Field of Classification Search .................... None
See application file for complete search history.

(56) References Cited

U.S. PATENT DOCUMENTS

| 4,863,247 | A | 9/1989 | Lasher et al. |
| 5,121,431 | A | 6/1992 | Wiener |
| 5,210,710 | A | 5/1993 | Omura |
| 5,347,481 | A | 9/1994 | Williams |
| 5,790,446 | A | 8/1998 | Yu et al. |
| 5,999,960 | A | 12/1999 | Gerwig et al. |
| 6,049,815 | A | 4/2000 | Lambert et al. |
| 6,065,033 | A | 5/2000 | Jouppi |
| 6,199,087 | B1 | 3/2001 | Blake et al. |
| 6,333,983 | B1 | 12/2001 | Enichen |
| 6,430,589 | B1 | 8/2002 | Jennings, III |
| 6,490,607 | B1 | 12/2002 | Oberman |
| 6,633,896 | B1 | 10/2003 | Moore et al. |

(Continued)

FOREIGN PATENT DOCUMENTS

EP    0247383    12/1987

OTHER PUBLICATIONS

U.S. Appl. No. 12/049,673, entitled "Floating Point Unit and Cryptographic Unit Having a Shared Multiplier Tree", filed Aug. 17, 2008.

(Continued)

Primary Examiner — Gilberto Barron, Jr.
Assistant Examiner — Malcolm Cribbs
(74) Attorney, Agent, or Firm — Meyertons, Hood, Kivlin, Kowert & Goetzel, P.C.; Anthony M. Petro

(57) ABSTRACT

A processor may include a hardware instruction fetch unit configured to issue instructions for execution, and a hardware functional unit configured to receive instructions for execution, where the instructions include cryptographic instruction(s) and non-cryptographic instruction(s). The functional unit may include a cryptographic execution pipeline configured to execute the cryptographic instructions with a corresponding cryptographic execution latency, and a non-cryptographic execution pipeline configured to execute the non-cryptographic instructions with a corresponding non-cryptographic execution latency that is longer than the cryptographic execution latency. The functional unit may further include a local bypass network configured to bypass results produced by the cryptographic execution pipeline to dependent cryptographic instructions executing within the cryptographic execution pipeline, such that each instruction within a sequence of dependent cryptographic instructions is executable with the cryptographic execution latency, and where the results of the cryptographic execution pipeline are not bypassed to any other functional unit within the processor.

20 Claims, 5 Drawing Sheets

U.S. PATENT DOCUMENTS

| | | | |
|---|---|---|---|
| 6,687,725 B1 | 2/2004 | Chen et al. | |
| 6,748,410 B1 | 6/2004 | Gressel et al. | |
| 6,763,365 B2 | 7/2004 | Chen et al. | |
| 6,820,105 B2 | 11/2004 | Blaker | |
| 7,110,538 B2 | 9/2006 | Gallant et al. | |
| 7,159,122 B2 | 1/2007 | Lundvall | |
| 7,181,484 B2 | 2/2007 | Stribaek et al. | |
| 7,212,959 B1 | 5/2007 | Purcell et al. | |
| 7,215,780 B2 | 5/2007 | Lambert et al. | |
| 7,240,084 B2 | 7/2007 | Gura et al. | |
| 7,257,718 B2 | 8/2007 | Lundvall | |
| 7,320,063 B1* | 1/2008 | Grohoski et al. | 712/214 |
| 7,321,910 B2 | 1/2008 | Crispin | |
| 7,346,159 B2 | 3/2008 | Gura et al. | |
| 7,353,364 B1 | 4/2008 | Chong et al. | |
| 7,372,960 B2 | 5/2008 | Lambert | |
| 7,389,403 B1 | 6/2008 | Alpert et al. | |
| 7,392,400 B2 | 6/2008 | Henry | |
| 7,502,943 B2 | 3/2009 | Henry | |
| 7,532,722 B2 | 5/2009 | Crispin | |
| 7,539,876 B2 | 5/2009 | Henry | |
| 7,542,566 B2 | 6/2009 | Henry | |
| 7,720,220 B2 | 5/2010 | Lundvall | |
| 7,725,736 B2 | 5/2010 | Lundvall | |
| 2002/0103843 A1 | 8/2002 | McGregor et al. | |
| 2003/0206629 A1 | 11/2003 | Eberle et al. | |
| 2003/0212729 A1 | 11/2003 | Eberle et al. | |
| 2004/0158597 A1 | 8/2004 | Ye et al. | |
| 2004/0230813 A1 | 11/2004 | Check | |
| 2004/0264693 A1 | 12/2004 | Shantz et al. | |
| 2004/0267855 A1 | 12/2004 | Shantz et al. | |
| 2005/0089160 A1 | 4/2005 | Crispin | |
| 2008/0148089 A1* | 6/2008 | Luick | 713/600 |

OTHER PUBLICATIONS

U.S. Appl. No. 12/415,403, entitled "Processor and Method for Implementing Instruction Support for Hash Algorithms", filed Mar. 31, 2009.

U.S. Appl. No. 12/414,755, entitled "Apparatus and Method for Implementing Instruction Support for the Data Encryption Standard (DES) Algorithm", filed Mar. 31, 2009.

Hitchcock, et al., "Implementing an Efficient Elliptic Curve Cryptosystem over $GF(p)$ on a Smart Card," Anziam J. 44(E), Apr. 1, 2003, 30 pages.

National Institute of Standards and Technology, "Recommended Elliptic Curves for Federal Government Use," Aug. 1999, 45 pages.

Hasegawa, et al., "A Practical Implementation of Elliptic Curve Cryptosystems over GF(p) on a 16-Bit Microcomputer," In Public Key Cryptography PKC, 1998, vol. 1431 of Lecture Notes in Computer Science, 14 pages.

Intel® Itanium™ Processor, "High Performance on Security Algorithms (RSA Decryption Kernel)," Intel Corporation 2001, pp. 1-8.

Intel® Itanium™, "Architecture Software Developer's Manual, vol. 1, Application Architecture," Revision 2.1, Oct. 2002, 2 pages.

Grobschadl, "Instruction Set Extension for Long Integer Modulo Arithmetic on RISC-Based Smart Cards," Proceedings of the 14th Symposium on Computer Architecture and High Performance Computing 2002, 7 pages.

Koc, "High-Speed RSA Implementation," Version 2.0, RSA Laboratories, Nov. 1994, pp. i-70.

Shantz, "From Euclid's GCD to Montgomery Multiplication to the Great Divide," Sun Microsystems, Jun. 2001, 13 pages.

Standards for Efficient Cryptography, "SEC 2: Recommended Elliptic Curve Domain Parameters," Certicom Research, Sep. 20, 2000, 51 pages.

Woodbury, et al., Sep. 2000, "Elliptic Curve Cryptography on Smart Cards Without Coprocessors," The Fourth Smart Card Research and Advanced Applications (CARDIS2000) Conference, Bristol, UK, pp. 71-92.

Cohen, et al., "Efficient Elliptic Curve Exponentiation Using Mixed Coordinates," Advances in Cryptology ASIACRYPT 98, Springer Verlag, 1998, LNCS 1514, 15 pages.

Bailey, et al., "Optimal Extension Fields for Fast Arithmetic in Public-Key Algorithms," In H. Krawczyk, editor, Advances in Cryptography—Crypto '98, vol. LNCS 1462, pp. 472-485, Pringer-Verlag 1998. http://citeseer.ist.psu.edu/article/bailey98optimal.html, 14 pages.

Pietilainen, "Elliptic Curve Cryptography on Smart Cards," Master's Thesis, Helsinki University of Technology, Oct. 12, 2000, pp. i-81.

Morain, et al., "Speeding Up the Computations on an Elliptic Curve Using Addition-Subtraction Chains," Rapport de Recherche 983, INRIA, France, Mar. 1989, http://citeseer.ist.psu.edu/morain90speeding.html, pp. 119-129.

Erdem, et al., "A Less Recursive Variant of Karatsuba-Ofman Algorithm for Multiplying Operands of Size a Power of Two," Proceedings of the 16th IEEE Symposium on Computer Arithmetic (ARITH-16'03), Jun. 15-18, 2003.

Gupta, et al., "Speeding up Secure Web Transactions Using Elliptic Curve Cryptography," Sun Microsystems, Inc., http://research.sun.com/projects/crypto/, 9 pages.

Comba, "Exponentiation Cryptosystems on the IBM PC," IBM Systems Journal, vol. 29, No. 4, 1990, pp. 526-538.

Kaliski, "TWIRL and RSA Key Size," Technical Notes, May 1, 2003, RSA Laboratories, 5 pages, downloaded from Internet http://www.orsasecurity.com/rsalabs/node.asp?id=2004 as of Sep. 13, 2006.

Gura, et al., "Comparing Elliptic Curve Cryptographic and RSA on 8-bit CPUs," Cryptographic Hardware and Embedded Systems—CHES 2004: 6th International Workshop (Cambridge, MA, USA), Aug. 11-13, 2004, LNCS, vol. 3156, ISBN 3-540-22666-4, pp. 119-132, Springer.

Karatsuba, et al., "Multiplication of Multidigit Numbers on Automata," Translated from Doklady Academi Nauk Sssr, vol. 145, No. 2, 4 pages, Feb. 9, 1962.

Hankerson, et al., "Guide to Elliptic Curve Cryptography," pp. 48-53, 95-113, 129-147, 205-212 and 224-226, Springer-Verlag, 2004.

Cohn, "Generate-Propogate Adders," ChoPP Computer Corporation, prior 2000, 15 pages.

MANO, "Computer System Architecture," Prentice-Hall, Inc., 1976, pp. 244-249.

Guajardo, et al., "Efficient Algorithms for Elliptic Curve Cryptosystems," ECE Dept., Worcester Polytechnic Institutue, CRYPTO 1997, Springer-Verlag, 1997, pp. 1-16.

Weimerskirch, et al., "Generalizations of the Karatsuba Algorithm for Polynomial Multiplication," Communication Security Group, Dept. of Electrical Engineering & Information Sciences, Ruhr-Universitat, Germany, Mar. 2002, pp. 1-23.

Blake-Wilson, et al., "Additional ECC Groups for IKE", IPSec Blake-Wilson, Dierks, Hawk-Working Group, Jul. 23, 2002, pp. 1-17.

Gupta, et al., "ECC Cipher Suites for TLS," Blake-Wilson, Dierks, Hawk—TLS Working Group, Aug. 2002, pp. 1-31.

"RFC 2246 on the TLS Protocol Version 1.0", http://www.ietf.org/mail-archive/ietf-announce/Current/msg02896.html, Mar. 26, 2003, 2 pages, including Dierks, T., "The TLS Protocol Version 1.0", Dierks & Allen, Jan. 1999, pp. 1-80.

Song, et al., "Low-Energy Digit-Serial/Parallel Finite Field Multipliers," Journal of VLSI Signal Processing 19, 1988, pp. 149-166.

Agnew, et al., "An Implementation of Elliptic Curve Cryptosystems Over F2155," IEEE Journal on Selected Areas on Communications, vol. 11. No. 5, Jun. 1993, pp. 804-813.

Halbutogullari, et al., "Mastrovito Multiplier for General Irreducible Polynomials," IEEE Transactions on Computers, Vo. 49, No. 5, May 2000, pp. 503-518.

Yanik, et al., "Incomplete Reduction in Modular Arithmetic," IEEE Proc.-Comput. Digit. Tech., vol. 149, No. 2, Mar. 2002, 7 pages.

Blum, et al., "High-Radix Montgomery Modular Exponentiation on Reconfigurable Hardware," IEEE Transactions on Computers, vol. 50, No. 7, Jul. 2001, pp. 759-764.

Gao, et al., "A Compact Fast Variable Key Size Elliptic Curve Cryptosystem Coprocessor," Proceedings of the Seventh Annual IEEE Symposium on Field-Programmable Custom Computer Machines, 1998, 2 pages.

Ernst, et al., "Rapid Prototyping for Hardware Accelerated Elliptic Curve Public-Key Cryptosystems," 12th IEEE Workshop on Rapid System Prototyping, Monterey, CA Jun. 2001, pp. 24-29.

Orlando, et al., Aug. 2000, "A High-Performance Reconfigurable Elliptic Curve Processor for GF(2m)," CHES 2000 Workshop on Cryptographic Hardware and Embedded Systems, Springer-Verlag, Lecture Notes in Computer Science, 1965, pp. 41-56.

Lopez, et al., Aug. 1999, "Fast Multiplication on Elliptic Curves over GF(2m) without Precomputation," CHES 1999 Workshop on Cryptographic Hardware and Embedded Systems, Springer-Verlag, Lecture Notes in Computer Science, 1717, pp. 316-327.

Hankerson, et al., Aug. 2000, "Software implementation of Elliptic Curve Cryptography over Binary Fields," CHES 2000 Workshop on Cryptographic Hardware and Embedded Systems, Springer-Verlag, Lecture Notes in Computer Science, 1965, pp. 1-24.

Koblitz, "Elliptic Curve Cryptosystems," Mathematics of Computation, Vo. 48, No. 177, Jan. 1987, pp. 203-209.

Schroeppel, et al., 1995, "Fast Key Exchange with Elliptic Curve Systems," Advances in Cryptography, Crypto '95, Springer-Verlag, Lecture Notes in Computer Science 963, pp. 43-56.

Goodman, et al., "An Energy-Efficient Reconfigurable Public-Key Cryptography Processor," IEEE Journal of Solid-State Circuits, vol. 36, No. 11, Nov. 2001, pp. 1808-1820.

Miller, "Use of Elliptic Curves of Cryptography," In Lecture Notes in Computer Science 218, Advances in Cryptology, CRYPTO '85, pp. 417-426, Springer-Verlag, Berling, 1986.

Itoh, et al., "A Fast Algorithm for Computer Multiplicative Inverses in GF(2m) Using Normal Bases," Informaiton and Computation, vol. 78, No. 3, 1988, pp. 171-177.

Bednara, et al., "Reconfigurable Implementation of Elliptic Curve Crypto Algorithms," Proceedings of the International Parallel and Distributed Processing Symposium, IEEE Computer Society, 2002, 8 pages.

National Institute of Standards and Technology, "Digital Signature Standard (DSS)," Federal Information Processing Standards Publication, Jan. 27, 2000, pp. 1-74.

Blake-Wilson, et al,, "ECC Cipher Suites for TLS," Blake-Wilson, Dierks, Hawk—TLS Working Group, Mar. 15, 2001, pp. 1-22.

U.S. Appl. No. 10/996,103, entitled "Hybrid Multi-Precision Multiplication", by Nils Gura and Lawrence A. Spracklen, filed Nov. 23, 2004.

U.S. Appl. No. 11/625,659, entitled "Generic Implementations of Elliptic Curve Cryptography Using Partial Reduction", by Nils Gura, Hans Eberle, and Edouard Goupy, filed Jan. 22, 2007.

Intel Corporation "Intel® IXP2850 Network Processor Product Brief" 2002 Intel Corporation.

VIA Technologies and Centaur Technologies "VIA PadLock Programming Guide" Version 1.60, May 3, 2005.

Shay Gueron "Advanced Encryption Standard (AES) Instructions Set" Copyright © 2008, Intel Corporation.

Processing Standards Publication 197 "Announcing the Advanced Encryption Standard (AES)" Federal Information Processing Standards Publication 197 Nov. 26, 2001.

\* cited by examiner

APPARATUS AND METHOD FOR LOCAL OPERAND BYPASSING FOR CRYPTOGRAPHIC INSTRUCTIONS

BACKGROUND

1. Field of the Invention

This invention relates to processors and, more particularly, to implementation of cryptographic algorithms.

2. Description of the Related Art

Securing transactions and communications against tampering, interception and unauthorized use has become a problem of increasing significance as new forms of electronic commerce and communication proliferate. For example, many businesses provide customers with Internet-based purchasing mechanisms, such as web pages via which customers may convey order and payment details. Such details often include sensitive information, such as credit card numbers, that might be subject to fraudulent use if intercepted by a third party.

To provide a measure of security for sensitive data, cryptographic algorithms have been developed that may allow encryption of sensitive information before it is conveyed over an insecure channel. The information may then be decrypted and used by the receiver. However, as the performance of generally available computer technology continues to increase (e.g., due to development of faster microprocessors), less sophisticated cryptographic algorithms become increasingly vulnerable to compromise or attack.

More sophisticated cryptographic algorithms are continually evolving to meet the threat posed by new types of attacks. However, as cryptographic algorithms become increasingly powerful, they often become computationally more complex to implement, potentially adding overhead to secure transactions and consequently reducing their performance.

SUMMARY

Various embodiments of a processor and method for local operand bypassing for cryptographic instructions are disclosed. In some embodiments, a processor may include a hardware instruction fetch unit configured to issue instructions for execution, where the instructions are programmer-selectable from a defined instruction set architecture (ISA), and a hardware functional unit configured to receive instructions for execution from the instruction fetch unit, where the instructions include one or more cryptographic instructions and one or more non-cryptographic instructions. The functional unit may include a cryptographic execution pipeline configured to execute the cryptographic instructions with a corresponding cryptographic execution latency, and a non-cryptographic execution pipeline configured to execute the non-cryptographic instructions with a corresponding non-cryptographic execution latency, where the non-cryptographic execution latency is longer than the cryptographic execution latency. The functional unit may further include a local bypass network configured to bypass results produced by the cryptographic execution pipeline to dependent cryptographic instructions executing within the cryptographic execution pipeline, such that each instruction within a sequence of dependent cryptographic instructions is executable with the cryptographic execution latency, and where the results of the cryptographic execution pipeline are not bypassed to any other functional unit within the processor.

Figure 1:
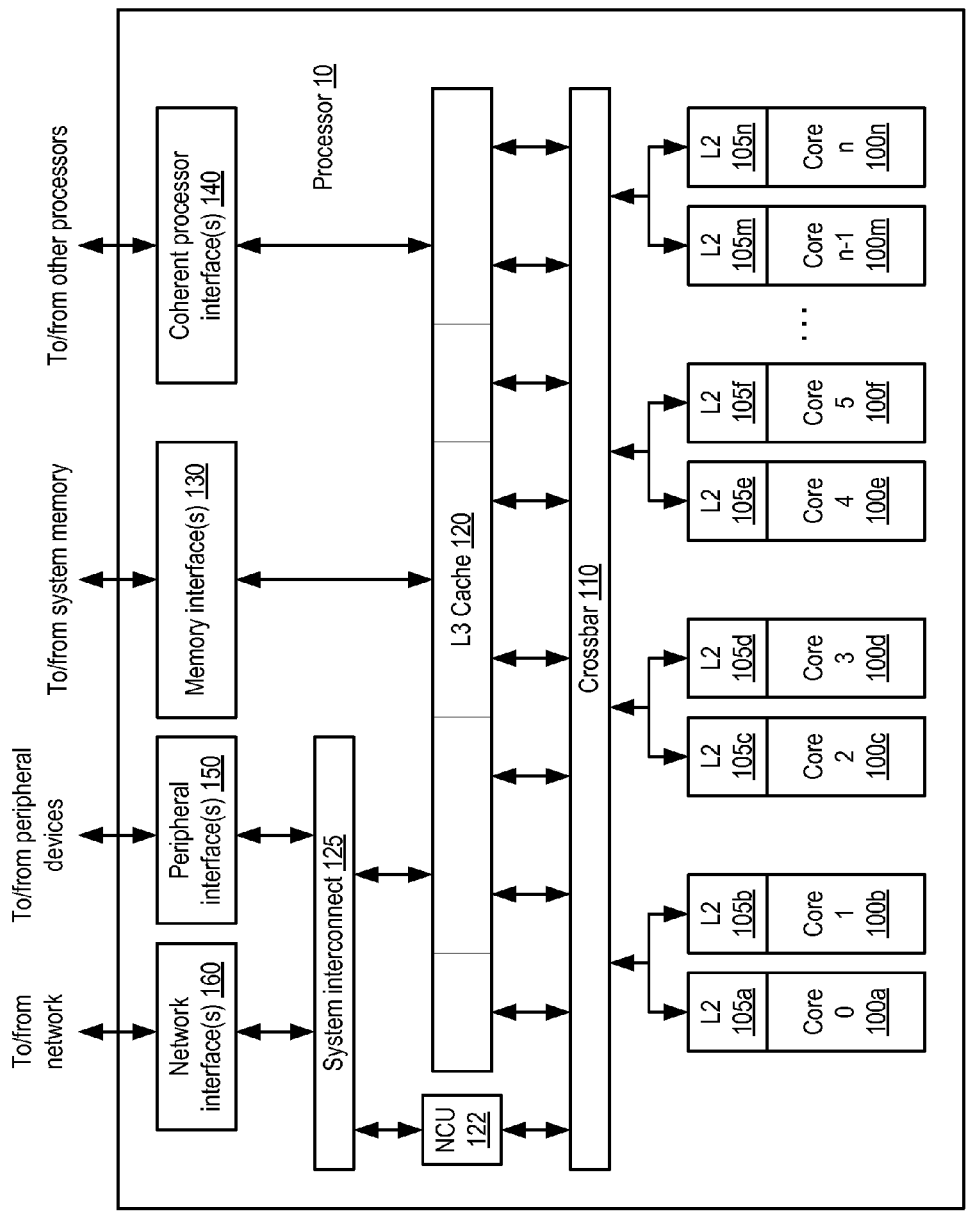
FIG. 1 is a block diagram illustrating an embodiment of a multithreaded processor.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form disclosed, but on the contrary, the intention is to cover all modifications, equivalents and alternatives falling within the spirit and scope of the present disclosure as defined by the appended claims.

DETAILED DESCRIPTION OF EMBODIMENTS

Introduction

In the following discussion, issues relating to operand bypassing for cryptographic instructions are explored. First, an overview is provided of one type of multithreaded processor in which cryptographic instruction support may be provided. Next, techniques for implementing algorithm-specific cryptographic instruction support are described. Operand bypassing considerations are then discussed both generally and particularly with respect to cryptographic operations. Finally, an example system embodiment including a processor that may implement these techniques is discussed.

Overview of Multithreaded Processor Architecture

A block diagram illustrating one embodiment of a multithreaded processor 10 is shown in FIG. 1. In the illustrated embodiment, processor 10 includes a number of processor cores 100*a-n*, which are also designated "core 0" though "core n." Various embodiments of processor 10 may include varying numbers of cores 100, such as 8, 16, or any other suitable number. Each of cores 100 is coupled to a corresponding L2 cache 105*a-n*, which in turn couple to L3 cache 120 via a crossbar 110. Cores 100*a-n* and L2 caches 105*a-n* may be generically referred to, either collectively or individually, as core(s) 100 and L2 cache(s) 105, respectively.

Via crossbar 110 and L3 cache 120, cores 100 may be coupled to a variety of devices that may be located externally to processor 10. In the illustrated embodiment, one or more memory interface(s) 130 may be configured to couple to one or more banks of system memory (not shown). One or more coherent processor interface(s) 140 may be configured to couple processor 10 to other processors (e.g., in a multiprocessor environment employing multiple units of processor 10). Additionally, system interconnect 125 couples cores 100 to one or more peripheral interface(s) 150 and network interface(s) 160. As described in greater detail below, these interfaces may be configured to couple processor 10 to various peripheral devices and networks.

Cores 100 may be configured to execute instructions and to process data according to a particular instruction set architecture (ISA). In one embodiment, cores 100 may be configured to implement a version of the SPARC® ISA, such as SPARC® V9, UltraSPARC Architecture 2005, UltraSPARC Architecture 2007, or UltraSPARC Architecture 2009, for example. However, in other embodiments it is contemplated that any desired ISA may be employed, such as x86 (32-bit or 64-bit versions), PowerPC® or MIPS®, for example.

In the illustrated embodiment, each of cores 100 may be configured to operate independently of the others, such that all cores 100 may execute in parallel. Additionally, as described below in conjunction with the description of FIG. 2, in some embodiments, each of cores 100 may be configured to execute multiple threads concurrently, where a given thread may include a set of instructions that may execute independently of instructions from another thread. (For example, an individual software process, such as an application, may consist of one or more threads that may be scheduled for execution by an operating system.) Such a core 100 may also be referred to as a multithreaded (MT) core. In one embodiment, each of cores 100 may be configured to concurrently execute instructions from a variable number of threads, up to eight concurrently-executing threads. In a 16-core implementation, processor 10 could thus concurrently execute up to 128 threads. However, in other embodiments it is contemplated that other numbers of cores 100 may be provided, and that cores 100 may concurrently process different numbers of threads.

Additionally, as described in greater detail below, in some embodiments, each of cores 100 may be configured to execute certain instructions out of program order, which may also be referred to herein as out-of-order execution, or simply OOO. As an example of out-of-order execution, for a particular thread, there may be instructions that are subsequent in program order to a given instruction yet do not depend on the given instruction. If execution of the given instruction is delayed for some reason (e.g., owing to a cache miss), the later instructions may execute before the given instruction completes, which may improve overall performance of the executing thread.

As shown in FIG. 1, in one embodiment, each core 100 may have a dedicated corresponding L2 cache 105. In one embodiment, L2 cache 105 may be configured as a set-associative, writeback cache that is fully inclusive of first-level cache state (e.g., instruction and data caches within core 100). To maintain coherence with first-level caches, embodiments of L2 cache 105 may implement a reverse directory that maintains a virtual copy of the first-level cache tags. L2 cache 105 may implement a coherence protocol (e.g., the MESI protocol) to maintain coherence with other caches within processor 10. In one embodiment, L2 cache 105 may enforce a Total Store Ordering (TSO) model of execution in which all store instructions from the same thread must complete in program order.

In various embodiments, L2 cache 105 may include a variety of structures configured to support cache functionality and performance. For example, L2 cache 105 may include a miss buffer configured to store requests that miss the L2, a fill buffer configured to temporarily store data returning from L3 cache 120, a writeback buffer configured to temporarily store dirty evicted data and snoop copyback data, and/or a snoop buffer configured to store snoop requests received from L3 cache 120. In one embodiment, L2 cache 105 may implement a history-based prefetcher that may attempt to analyze L2 miss behavior and correspondingly generate prefetch requests to L3 cache 120.

Crossbar 110 may be configured to manage data flow between L2 caches 105 and the shared L3 cache 120. In one embodiment, crossbar 110 may include logic (such as multiplexers or a switch fabric, for example) that allows any L2 cache 105 to access any bank of L3 cache 120, and that conversely allows data to be returned from any L3 bank to any L2 cache 105. That is, crossbar 110 may be configured as an M-to-N crossbar that allows for generalized point-to-point communication. However, in other embodiments, other interconnection schemes may be employed between L2 caches 105 and L3 cache 120. For example, a mesh, ring, or other suitable topology may be utilized.

Crossbar 110 may be configured to concurrently process data requests from L2 caches 105 to L3 cache 120 as well as data responses from L3 cache 120 to L2 caches 105. In some embodiments, crossbar 110 may include logic to queue data requests and/or responses, such that requests and responses may not block other activity while waiting for service. Additionally, in one embodiment crossbar 110 may be configured to arbitrate conflicts that may occur when multiple L2 caches 105 attempt to access a single bank of L3 cache 120, or vice versa.

L3 cache 120 may be configured to cache instructions and data for use by cores 100. In the illustrated embodiment, L3 cache 120 may be organized into eight separately addressable banks that may each be independently accessed, such that in the absence of conflicts, each bank may concurrently return data to a respective L2 cache 105. In some embodiments, each individual bank may be implemented using set-associative or direct-mapped techniques. For example, in one embodiment, L3 cache 120 may be an 8 megabyte (MB) cache, where each 1 MB bank is 16-way set associative with a 64-byte line size. L3 cache 120 may be implemented in some embodiments as a writeback cache in which written (dirty) data may not be written to system memory until a corresponding cache line is evicted. However, it is contemplated that in other embodiments, L3 cache 120 may be configured in any suitable fashion. For example, L3 cache 120 may be implemented with more or fewer banks, or in a scheme that does not employ independently-accessible banks; it may employ other bank sizes or cache geometries (e.g., different line sizes or degrees of set associativity); it may employ write-through instead of writeback behavior; and it may or may not allocate on a write miss. Other variations of L3 cache 120 configuration are possible and contemplated.

In some embodiments, L3 cache 120 may implement queues for requests arriving from and results to be sent to crossbar 110. Additionally, in some embodiments L3 cache 120 may implement a fill buffer configured to store fill data arriving from memory interface 130, a writeback buffer configured to store dirty evicted data to be written to memory, and/or a miss buffer configured to store L3 cache accesses that cannot be processed as simple cache hits (e.g., L3 cache misses, cache accesses matching older misses, accesses such as atomic operations that may require multiple cache accesses, etc.). L3 cache 120 may variously be implemented as single-ported or multiported (i.e., capable of processing multiple concurrent read and/or write accesses). In either case, L3 cache 120 may implement arbitration logic to prioritize cache access among various cache read and write requestors.

Not all external accesses from cores 100 necessarily proceed through L3 cache 120. In the illustrated embodiment, non-cacheable unit (NCU) 122 may be configured to process requests from cores 100 for non-cacheable data, such as data from I/O devices as described below with respect to peripheral interface(s) 150 and network interface(s) 160.

Memory interface 130 may be configured to manage the transfer of data between L3 cache 120 and system memory, for example in response to cache fill requests and data evictions. In some embodiments, multiple instances of memory interface 130 may be implemented, with each instance configured to control a respective bank of system memory. Memory interface 130 may be configured to interface to any suitable type of system memory, such as Fully Buffered Dual Inline Memory Module (FB-DIMM), Double Data Rate or Double Data Rate 2, 3, or 4 Synchronous Dynamic Random Access Memory (DDR/DDR2/DDR3/DDR4 SDRAM), or Rambus® DRAM (RDRAM®), for example. In some embodiments, memory interface 130 may be configured to support interfacing to multiple different types of system memory.

In the illustrated embodiment, processor 10 may also be configured to receive data from sources other than system memory. System interconnect 125 may be configured to provide a central interface for such sources to exchange data with cores 100, L2 caches 105, and/or L3 cache 120. In some embodiments, system interconnect 125 may be configured to coordinate Direct Memory Access (DMA) transfers of data to and from system memory. For example, via memory interface 130, system interconnect 125 may coordinate DMA transfers between system memory and a network device attached via network interface 160, or between system memory and a peripheral device attached via peripheral interface 150.

Processor 10 may be configured for use in a multiprocessor environment with other instances of processor 10 or other compatible processors. In the illustrated embodiment, coherent processor interface(s) 140 may be configured to implement high-bandwidth, direct chip-to-chip communication between different processors in a manner that preserves memory coherence among the various processors (e.g., according to a coherence protocol that governs memory transactions).

Peripheral interface 150 may be configured to coordinate data transfer between processor 10 and one or more peripheral devices. Such peripheral devices may include, for example and without limitation, storage devices (e.g., magnetic or optical media-based storage devices including hard drives, tape drives, CD drives, DVD drives, etc.), display devices (e.g., graphics subsystems), multimedia devices (e.g., audio processing subsystems), or any other suitable type of peripheral device. In one embodiment, peripheral interface 150 may implement one or more instances of a standard peripheral interface. For example, one embodiment of peripheral interface 150 may implement the Peripheral Component Interface Express (PCI Express™ or PCIe) standard according to generation 1.x, 2.0, 3.0, or another suitable variant of that standard, with any suitable number of I/O lanes. However, it is contemplated that any suitable interface standard or combination of standards may be employed. For example, in some embodiments peripheral interface 150 may be configured to implement a version of Universal Serial Bus (USB) protocol or IEEE 1394 (Firewire®) protocol in addition to or instead of PCI Express™.

Network interface 160 may be configured to coordinate data transfer between processor 10 and one or more network devices (e.g., networked computer systems or peripherals) coupled to processor 10 via a network. In one embodiment, network interface 160 may be configured to perform the data processing necessary to implement an Ethernet (IEEE 802.3) networking standard such as Gigabit Ethernet or 10-Gigabit Ethernet, for example. However, it is contemplated that any suitable networking standard may be implemented, including forthcoming standards such as 40-Gigabit Ethernet and 100-Gigabit Ethernet. In some embodiments, network interface 160 may be configured to implement other types of networking protocols, such as Fibre Channel, Fibre Channel over Ethernet (FCoE), Data Center Ethernet, Infiniband, and/or other suitable networking protocols. In some embodiments, network interface 160 may be configured to implement multiple discrete network interface ports.

Overview of Dynamic Multithreading Processor Core

As mentioned above, in one embodiment each of cores 100 may be configured for multithreaded, out-of-order execution. More specifically, in one embodiment, each of cores 100 may be configured to perform dynamic multithreading. Generally speaking, under dynamic multithreading, the execution resources of cores 100 may be configured to efficiently process varying types of computational workloads that exhibit different performance characteristics and resource requirements. Such workloads may vary across a continuum that emphasizes different combinations of individual-thread and multiple-thread performance.

At one end of the continuum, a computational workload may include a number of independent tasks, where completing the aggregate set of tasks within certain performance criteria (e.g., an overall number of tasks per second) is a more significant factor in system performance than the rate at which any particular task is completed. For example, in certain types of server or transaction processing environments, there may be a high volume of individual client or customer requests (such as web page requests or file system accesses). In this context, individual requests may not be particularly sensitive to processor performance. For example, requests may be I/O-bound rather than processor-bound—completion of an individual request may require I/O accesses (e.g., to relatively slow memory, network, or storage devices) that dominate the overall time required to complete the request, relative to the processor effort involved. Thus, a processor that is capable of concurrently processing many such tasks (e.g., as independently executing threads) may exhibit better performance on such a workload than a processor that emphasizes the performance of only one or a small number of concurrent tasks.

At the other end of the continuum, a computational workload may include individual tasks whose performance is highly processor-sensitive. For example, a task that involves significant mathematical analysis and/or transformation (e.g., cryptography, graphics processing, scientific computing) may be more processor-bound than I/O-bound. Such tasks may benefit from processors that emphasize single-task performance, for example through speculative execution and exploitation of instruction-level parallelism.

Dynamic multithreading represents an attempt to allocate processor resources in a manner that flexibly adapts to workloads that vary along the continuum described above. In one embodiment, cores 100 may be configured to implement fine-grained multithreading, in which each core may select instructions to execute from among a pool of instructions corresponding to multiple threads, such that instructions from different threads may be scheduled to execute adjacently. For example, in a pipelined embodiment of core 100 employing fine-grained multithreading, instructions from different threads may occupy adjacent pipeline stages, such that instructions from several threads may be in various stages of execution during a given core processing cycle. Through the use of fine-grained multithreading, cores 100 may be configured to efficiently process workloads that depend more on concurrent thread processing than individual thread performance.

In one embodiment, cores 100 may also be configured to implement out-of-order processing, speculative execution, register renaming and/or other features that improve the performance of processor-dependent workloads. Moreover, cores 100 may be configured to dynamically allocate a variety of hardware resources among the threads that are actively executing at a given time, such that if fewer threads are executing, each individual thread may be able to take advantage of a greater share of the available hardware resources. This may result in increased individual thread performance when fewer threads are executing, while retaining the flexibility to support workloads that exhibit a greater number of threads that are less processor-dependent in their performance. In various embodiments, the resources of a given core 100 that may be dynamically allocated among a varying number of threads may include branch resources (e.g., branch predictor structures), load/store resources (e.g., load/store buffers and queues), instruction completion resources (e.g., reorder buffer structures and commit logic), instruction issue resources (e.g., instruction selection and scheduling structures), register rename resources (e.g., register mapping tables), and/or memory management unit resources (e.g., translation lookaside buffers, page walk resources).

Figure 2:
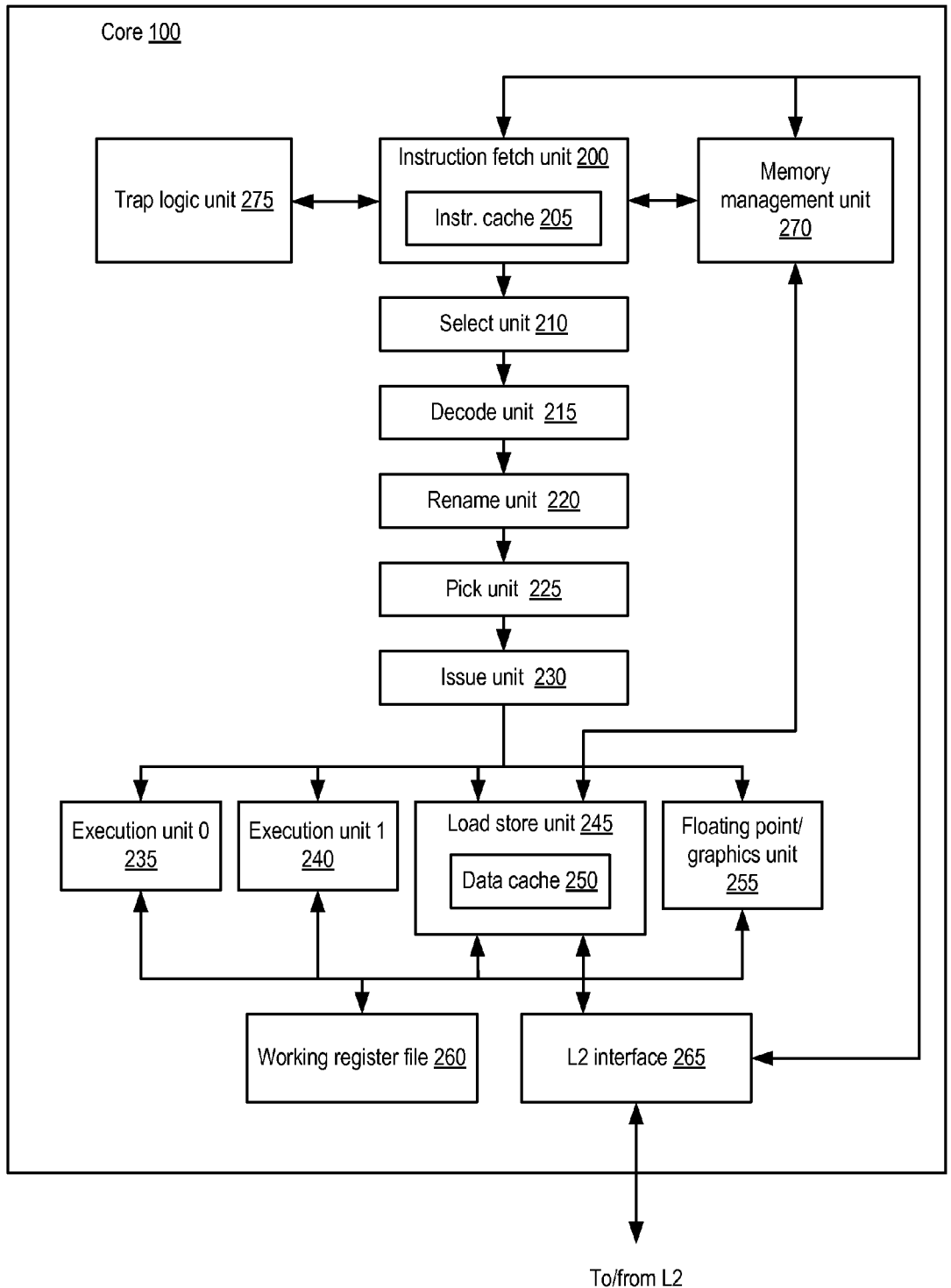
FIG. 2 is a block diagram illustrating an embodiment of a processor core configured to perform fine-grained multithreading.

One embodiment of core 100 that is configured to perform dynamic multithreading is illustrated in FIG. 2. In the illustrated embodiment, core 100 includes an instruction fetch unit (IFU) 200 that includes an instruction cache 205. IFU 200 is coupled to a memory management unit (MMU) 270, L2 interface 265, and trap logic unit (TLU) 275. IFU 200 is additionally coupled to an instruction processing pipeline that begins with a select unit 210 and proceeds in turn through a decode unit 215, a rename unit 220, a pick unit 225, and an issue unit 230. Issue unit 230 is coupled to issue instructions to any of a number of instruction execution resources: an execution unit 0 (EXU0) 235, an execution unit 1 (EXU1) 240, a load store unit (LSU) 245 that includes a data cache 250, and/or a floating point/graphics unit (FGU) 255. These instruction execution resources are coupled to a working register file 260. Additionally, LSU 245 is coupled to L2 interface 265 and MMU 270.

In the following discussion, exemplary embodiments of each of the structures of the illustrated embodiment of core 100 are described. However, it is noted that the illustrated partitioning of resources is merely one example of how core 100 may be implemented. Alternative configurations and variations are possible and contemplated.

Instruction fetch unit 200 may be configured to provide instructions to the rest of core 100 for execution. In one embodiment, IFU 200 may be configured to select a thread to be fetched, fetch instructions from instruction cache 205 for the selected thread and buffer them for downstream processing, request data from L2 cache 105 in response to instruction cache misses, and predict the direction and target of control transfer instructions (e.g., branches). In some embodiments, IFU 200 may include a number of data structures in addition to instruction cache 205, such as an instruction translation lookaside buffer (ITLB), instruction buffers, and/or structures configured to store state that is relevant to thread selection and processing.

In one embodiment, during each execution cycle of core 100, IFU 200 may be configured to select one thread that will enter the IFU processing pipeline. Thread selection may take into account a variety of factors and conditions, some thread-specific and others IFU-specific. For example, certain instruction cache activities (e.g., cache fill), ITLB activities, or diagnostic activities may inhibit thread selection if these activities are occurring during a given execution cycle. Additionally, individual threads may be in specific states of readiness that affect their eligibility for selection. For example, a thread for which there is an outstanding instruction cache miss may not be eligible for selection until the miss is resolved. In some embodiments, those threads that are eligible to participate in thread selection may be divided into groups by priority, for example depending on the state of the thread or of the ability of the IFU pipeline to process the thread. In such embodiments, multiple levels of arbitration may be employed to perform thread selection: selection occurs first by group priority, and then within the selected group according to a suitable arbitration algorithm (e.g., a least-recently-fetched algorithm). However, it is noted that any suitable scheme for thread selection may be employed, including arbitration schemes that are more complex or simpler than those mentioned here.

Once a thread has been selected for fetching by IFU 200, instructions may actually be fetched for the selected thread. To perform the fetch, in one embodiment, IFU 200 may be configured to generate a fetch address to be supplied to instruction cache 205. In various embodiments, the fetch address may be generated as a function of a program counter associated with the selected thread, a predicted branch target address, or an address supplied in some other manner (e.g., through a test or diagnostic mode). The generated fetch address may then be applied to instruction cache 205 to determine whether there is a cache hit.

In some embodiments, accessing instruction cache 205 may include performing fetch address translation (e.g., in the case of a physically indexed and/or tagged cache), accessing a cache tag array, and comparing a retrieved cache tag to a requested tag to determine cache hit status. If there is a cache hit, IFU 200 may store the retrieved instructions within buffers for use by later stages of the instruction pipeline. If there is a cache miss, IFU 200 may coordinate retrieval of the missing cache data from L2 cache 105. In some embodiments, IFU 200 may also be configured to prefetch instructions into instruction cache 205 before the instructions are actually required to be fetched. For example, in the case of a cache miss, IFU 200 may be configured to retrieve the missing data for the requested fetch address as well as addresses that sequentially follow the requested fetch address, on the assumption that the following addresses are likely to be fetched in the near future.

In many ISAs, instruction execution proceeds sequentially according to instruction addresses (e.g., as reflected by one or more program counters). However, control transfer instructions (CTIs) such as branches, call/return instructions, or other types of instructions may cause the transfer of execution from a current fetch address to a nonsequential address. As mentioned above, IFU 200 may be configured to predict the direction and target of CTIs (or, in some embodiments, a subset of the CTIs that are defined for an ISA) in order to reduce the delays incurred by waiting until the effect of a CTI is known with certainty. In one embodiment, IFU 200 may be configured to implement a perceptron-based dynamic branch predictor, although any suitable type of branch predictor may be employed.

To implement branch prediction, IFU 200 may implement a variety of control and data structures in various embodiments, such as history registers that track prior branch history, weight tables that reflect relative weights or strengths of predictions, and/or target data structures that store fetch addresses that are predicted to be targets of a CTI. Also, in some embodiments, IFU 200 may further be configured to partially decode (or predecode) fetched instructions in order to facilitate branch prediction. A predicted fetch address for a given thread may be used as the fetch address when the given thread is selected for fetching by IFU 200. The outcome of the prediction may be validated when the CTI is actually executed (e.g., if the CTI is a conditional instruction, or if the CTI itself is in the path of another predicted CTI). If the prediction was incorrect, instructions along the predicted path that were fetched and issued may be cancelled.

Through the operations discussed above, IFU 200 may be configured to fetch and maintain a buffered pool of instructions from one or multiple threads, to be fed into the remainder of the instruction pipeline for execution. Generally speaking, select unit 210 may be configured to select and schedule threads for execution. In one embodiment, during any given execution cycle of core 100, select unit 210 may be configured to select up to one ready thread out of the maximum number of threads concurrently supported by core 100 (e.g., 8 threads), and may select up to two instructions from the selected thread for decoding by decode unit 215, although in other embodiments, a differing number of threads and instructions may be selected. In various embodiments, different conditions may affect whether a thread is ready for selection by select unit 210, such as branch mispredictions, unavailable instructions, or other conditions. To ensure fairness in thread selection, some embodiments of select unit 210 may employ arbitration among ready threads (e.g. a least-recently-used algorithm).

The particular instructions that are selected for decode by select unit 210 may be subject to the decode restrictions of decode unit 215; thus, in any given cycle, fewer than the maximum possible number of instructions may be selected. Additionally, in some embodiments, select unit 210 may be configured to allocate certain execution resources of core 100 to the selected instructions, so that the allocated resources will not be used for the benefit of another instruction until they are released. For example, select unit 210 may allocate resource tags for entries of a reorder buffer, load/store buffers, or other downstream resources that may be utilized during instruction execution.

Generally, decode unit 215 may be configured to prepare the instructions selected by select unit 210 for further processing. Decode unit 215 may be configured to identify the particular nature of an instruction (e.g., as specified by its opcode) and to determine the source and sink (i.e., destination) registers encoded in an instruction, if any. In some embodiments, decode unit 215 may be configured to detect certain dependencies among instructions, to remap architectural registers to a flat register space, and/or to convert certain complex instructions to two or more simpler instructions for execution. Additionally, in some embodiments, decode unit 215 may be configured to assign instructions to slots for subsequent scheduling. In one embodiment, two slots 0-1 may be defined, where slot 0 includes instructions executable in load/store unit 245 or execution units 235-240, and where slot 1 includes instructions executable in execution units 235-240, floating point/graphics unit 255, and any branch instructions. However, in other embodiments, other numbers of slots and types of slot assignments may be employed, or slots may be omitted entirely.

Register renaming may facilitate the elimination of certain dependencies between instructions (e.g., write-after-read or "false" dependencies), which may in turn prevent unnecessary serialization of instruction execution. In one embodiment, rename unit 220 may be configured to rename the logical (i.e., architected) destination registers specified by instructions by mapping them to a physical register space, resolving false dependencies in the process. In some embodiments, rename unit 220 may maintain mapping tables that reflect the relationship between logical registers and the physical registers to which they are mapped.

Once decoded and renamed, instructions may be ready to be scheduled for execution. In the illustrated embodiment, pick unit 225 may be configured to pick instructions that are ready for execution and send the picked instructions to issue unit 230. In one embodiment, pick unit 225 may be configured to maintain a pick queue that stores a number of decoded and renamed instructions as well as information about the relative age and status of the stored instructions. During each execution cycle, this embodiment of pick unit 225 may pick up to one instruction per slot. For example, taking instruction dependency and age information into account, for a given slot, pick unit 225 may be configured to pick the oldest instruction for the given slot that is ready to execute.

In some embodiments, pick unit 225 may be configured to support load/store speculation by retaining speculative load/store instructions (and, in some instances, their dependent instructions) after they have been picked. This may facilitate replaying of instructions in the event of load/store misspeculation. Additionally, in some embodiments, pick unit 225 may be configured to deliberately insert "holes" into the pipeline through the use of stalls, e.g., in order to manage downstream pipeline hazards such as synchronization of certain load/store or long-latency FGU instructions.

Issue unit 230 may be configured to provide instruction sources and data to the various execution units for picked instructions. In one embodiment, issue unit 230 may be configured to read source operands from the appropriate source, which may vary depending upon the state of the pipeline. For example, if a source operand depends on a prior instruction that is still in the execution pipeline, the operand may be bypassed directly from the appropriate execution unit result bus. Results may also be sourced from register files representing architectural (i.e., user-visible) as well as non-architectural state. In the illustrated embodiment, core 100 includes a working register file 260 that may be configured to store instruction results (e.g., integer results, floating point results, and/or condition code results) that have not yet been committed to architectural state, and which may serve as the source for certain operands. The various execution units may also maintain architectural integer, floating-point, and condition code state from which operands may be sourced.

Instructions issued from issue unit 230 may proceed to one or more of the illustrated execution units for execution. In one embodiment, each of EXU0 235 and EXU1 240 may be similarly or identically configured to execute certain integer-type instructions defined in the implemented ISA, such as arithmetic, logical, and shift instructions. In the illustrated embodiment, EXU0 235 may be configured to execute integer instructions issued from slot 0, and may also perform address calculation and for load/store instructions executed by LSU 245. EXU1 240 may be configured to execute integer instructions issued from slot 1, as well as branch instructions. In one embodiment, FGU instructions and multicycle integer instructions may be processed as slot 1 instructions that pass through the EXU1 240 pipeline, although some of these instructions may actually execute in other functional units.

In some embodiments, architectural and non-architectural register files may be physically implemented within or near execution units 235-240. It is contemplated that in some embodiments, core 100 may include more or fewer than two integer execution units, and the execution units may or may not be symmetric in functionality. Also, in some embodiments execution units 235-240 may not be bound to specific issue slots, or may be differently bound than just described.

Load store unit 245 may be configured to process data memory references, such as integer and floating-point load and store instructions and other types of memory reference instructions. LSU 245 may include a data cache 250 as well as logic configured to detect data cache misses and to responsively request data from L2 cache 105. In one embodiment, data cache 250 may be configured as a set-associative, write-through cache in which all stores are written to L2 cache 105 regardless of whether they hit in data cache 250. As noted above, the actual computation of addresses for load/store instructions may take place within one of the integer execution units, though in other embodiments, LSU 245 may implement dedicated address generation logic. In some embodiments, LSU 245 may implement an adaptive, history-dependent hardware prefetcher configured to predict and prefetch data that is likely to be used in the future, in order to increase the likelihood that such data will be resident in data cache 250 when it is needed.

In various embodiments, LSU 245 may implement a variety of structures configured to facilitate memory operations. For example, LSU 245 may implement a data TLB to cache virtual data address translations, as well as load and store buffers configured to store issued but not-yet-committed load and store instructions for the purposes of coherency snooping and dependency checking LSU 245 may include a miss buffer configured to store outstanding loads and stores that cannot yet complete, for example due to cache misses. In one embodiment, LSU 245 may implement a store queue configured to store address and data information for stores that have committed, in order to facilitate load dependency checking LSU 245 may also include hardware configured to support atomic load-store instructions, memory-related exception detection, and read and write access to special-purpose registers (e.g., control registers).

Floating point/graphics unit 255 may be configured to execute and provide results for certain floating-point and graphics-oriented instructions defined in the implemented ISA. For example, in one embodiment FGU 255 may implement single- and double-precision floating-point arithmetic instructions compliant with the IEEE 754-1985 floating-point standard, such as add, subtract, multiply, divide, and certain transcendental functions. Also, in one embodiment FGU 255 may implement partitioned-arithmetic and graphics-oriented instructions defined by a version of the SPARC® Visual Instruction Set (VIS™) architecture, such as VIS™ 2.0 or VIS™ 3.0. In some embodiments, FGU 255 may implement fused and unfused floating-point multiply-add instructions. Additionally, in one embodiment FGU 255 may implement certain integer instructions such as integer multiply, divide, and population count instructions. Depending on the implementation of FGU 255, some instructions (e.g., some transcendental or extended-precision instructions) or instruction operand or result scenarios (e.g., certain denormal operands or expected results) may be trapped and handled or emulated by software.

In one embodiment, FGU 255 may implement separate execution pipelines for floating point add/multiply, divide/square root, and graphics operations, while in other embodiments the instructions implemented by FGU 255 may be differently partitioned. In various embodiments, instructions implemented by FGU 255 may be fully pipelined (i.e., FGU 255 may be capable of starting one new instruction per execution cycle), partially pipelined, or may block issue until complete, depending on the instruction type. For example, in one embodiment floating-point add and multiply operations may be fully pipelined, while floating-point divide operations may block other divide/square root operations until completed.

Embodiments of FGU 255 may also be configured to implement hardware cryptographic support. For example, FGU 255 may include logic configured to support encryption/decryption algorithms such as Advanced Encryption Standard (AES), Data Encryption Standard/Triple Data Encryption Standard (DES/3DES), the Kasumi block cipher algorithm, and/or the Camellia block cipher algorithm. FGU 255 may also include logic to implement hash or checksum algorithms such as Secure Hash Algorithm (SHA-1, SHA-256, SHA-384, SHA-512), or Message Digest 5 (MD5). FGU 255 may also be configured to implement modular arithmetic such as modular multiplication, reduction and exponentiation, as well as various types of Galois field operations. In one embodiment, FGU 255 may be configured to utilize the floating-point multiplier array for modular multiplication. In various embodiments, FGU 255 may implement several of the aforementioned algorithms as well as other algorithms not specifically described.

The various cryptographic and modular arithmetic operations provided by FGU 255 may be invoked in different ways for different embodiments. In one embodiment, these features may be implemented via a discrete coprocessor that may be indirectly programmed by software, for example by using a control word queue defined through the use of special registers or memory-mapped registers. In another embodiment, the ISA may be augmented with specific instructions that may allow software to directly perform these operations.

As previously described, instruction and data memory accesses may involve translating virtual addresses to physical addresses. In one embodiment, such translation may occur on a page level of granularity, where a certain number of address bits comprise an offset into a given page of addresses, and the remaining address bits comprise a page number. For example, in an embodiment employing 4 MB pages, a 64-bit virtual address and a 40-bit physical address, 22 address bits (corresponding to 4 MB of address space, and typically the least significant address bits) may constitute the page offset. The remaining 42 bits of the virtual address may correspond to the virtual page number of that address, and the remaining 18 bits of the physical address may correspond to the physical page number of that address. In such an embodiment, virtual to physical address translation may occur by mapping a virtual page number to a particular physical page number, leaving the page offset unmodified.

Such translation mappings may be stored in an ITLB or a DTLB for rapid translation of virtual addresses during lookup of instruction cache 205 or data cache 250. In the event no translation for a given virtual page number is found in the appropriate TLB, memory management unit 270 may be configured to provide a translation. In one embodiment, MMU 270 may be configured to manage one or more translation tables stored in system memory and to traverse such tables (which in some embodiments may be hierarchically organized) in response to a request for an address translation, such as from an ITLB or DTLB miss. (Such a traversal may also be referred to as a page table walk or a hardware table walk.) In some embodiments, if MMU 270 is unable to derive a valid address translation, for example if one of the memory pages including a necessary page table is not resident in physical memory (i.e., a page miss), MMU 270 may be configured to generate a trap to allow a memory management software routine to handle the translation. It is contemplated that in various embodiments, any desirable page size may be employed. Further, in some embodiments multiple page sizes may be concurrently supported.

As noted above, several functional units in the illustrated embodiment of core 100 may be configured to generate off-core memory requests. For example, IFU 200 and LSU 245 each may generate access requests to L2 cache 105 in response to their respective cache misses. Additionally, MMU 270 may be configured to generate memory requests, for example while executing a page table walk. In the illustrated embodiment, L2 interface 265 may be configured to provide a centralized interface to the L2 cache 105 associated with a particular core 100, on behalf of the various functional units that may generate L2 accesses. In one embodiment, L2 interface 265 may be configured to maintain queues of pending L2 requests and to arbitrate among pending requests to determine which request or requests may be conveyed to L2 cache 105 during a given execution cycle. For example, L2 interface 265 may implement a least-recently-used or other algorithm to arbitrate among L2 requestors. In one embodiment, L2 interface 265 may also be configured to receive data returned from L2 cache 105, and to direct such data to the appropriate functional unit (e.g., to data cache 250 for a data cache fill due to miss).

During the course of operation of some embodiments of core 100, exceptional events may occur. For example, an instruction from a given thread that is selected for execution by select unit 210 may not be a valid instruction for the ISA implemented by core 100 (e.g., the instruction may have an illegal opcode), a floating-point instruction may produce a result that requires further processing in software, MMU 270 may not be able to complete a page table walk due to a page miss, a hardware error (such as uncorrectable data corruption in a cache or register file) may be detected, or any of numerous other possible architecturally-defined or implementation-specific exceptional events may occur. In one embodiment, trap logic unit 275 may be configured to manage the handling of such events. For example, TLU 275 may be configured to receive notification of an exceptional event occurring during execution of a particular thread, and to cause execution control of that thread to vector to a supervisor-mode software handler (i.e., a trap handler) corresponding to the detected event. Such handlers may include, for example, an illegal opcode trap handler configured to return an error status indication to an application associated with the trapping thread and possibly terminate the application, a floating-point trap handler configured to fix up an inexact result, etc.

In one embodiment, TLU 275 may be configured to flush all instructions from the trapping thread from any stage of processing within core 100, without disrupting the execution of other, non-trapping threads. In some embodiments, when a specific instruction from a given thread causes a trap (as opposed to a trap-causing condition independent of instruction execution, such as a hardware interrupt request), TLU 275 may implement such traps as precise traps. That is, TLU 275 may ensure that all instructions from the given thread that occur before the trapping instruction (in program order) complete and update architectural state, while no instructions from the given thread that occur after the trapping instruction (in program) order complete or update architectural state.

Additionally, in the absence of exceptions or trap requests, TLU 275 may be configured to initiate and monitor the commitment of working results to architectural state. For example, TLU 275 may include a reorder buffer (ROB) that coordinates transfer of speculative results into architectural state. TLU 275 may also be configured to coordinate thread flushing that results from branch misprediction. For instructions that are not flushed or otherwise cancelled due to mispredictions or exceptions, instruction processing may end when instruction results have been committed.

In various embodiments, any of the units illustrated in FIG. 2 may be implemented as one or more pipeline stages, to form an instruction execution pipeline that begins when thread fetching occurs in IFU 200 and ends with result commitment by TLU 275. Depending on the manner in which the functionality of the various units of FIG. 2 is partitioned and implemented, different units may require different numbers of cycles to complete their portion of instruction processing. In some instances, certain units (e.g., FGU 255) may require a variable number of cycles to complete certain types of operations.

Through the use of dynamic multithreading, in some instances, it is possible for each stage of the instruction pipeline of core 100 to hold an instruction from a different thread in a different stage of execution, in contrast to conventional processor implementations that typically require a pipeline flush when switching between threads or processes. In some embodiments, flushes and stalls due to resource conflicts or other scheduling hazards may cause some pipeline stages to have no instruction during a given cycle. However, in the fine-grained multithreaded processor implementation employed by the illustrated embodiment of core 100, such flushes and stalls may be directed to a single thread in the pipeline, leaving other threads undisturbed. Additionally, even if one thread being processed by core 100 stalls for a significant length of time (for example, due to an L2 cache miss), instructions from another thread may be readily selected for issue, thus increasing overall thread processing throughput.

As described previously, however, the various resources of core 100 that support fine-grained multithreaded execution may also be dynamically reallocated to improve the performance of workloads having fewer numbers of threads. Under these circumstances, some threads may be allocated a larger share of execution resources while other threads are allocated correspondingly fewer resources. Even when fewer threads are sharing comparatively larger shares of execution resources, however, core 100 may still exhibit the flexible, thread-specific flush and stall behavior described above.

Instruction Support for Cryptographic Operations

Figure 3:
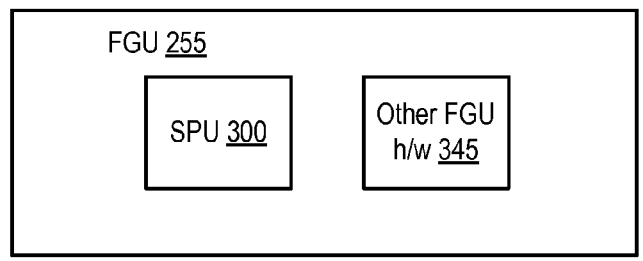
FIG. 3 is a block diagram illustrating an embodiment of a floating-point graphics unit including a cryptographic unit.

As noted above, in some embodiments FGU 255 may be configured to support cryptographic operations including encryption/decryption and hashing algorithms using coprocessing hardware. For example, as shown in FIG. 3, an embodiment of FGU 255 includes a stream processing unit (SPU) 300 and various other FGU hardware 345. In the illustrated embodiment, SPU 300 may be configured to perform various encryption/decryption algorithms and/or hash algorithms, while FGU hardware 345 may be configured to perform other types of operations such as floating-point arithmetic, partitioned arithmetic, graphics processing algorithms, or the like.

In various embodiments, SPU 300 may be configured to perform operations that implement cryptographic algorithms such as the Advanced Encryption Standard (AES) cipher, the Data Encryption Standard (DES) cipher, the Kasumi cipher, the Camellia cipher, and/or other ciphers. Also, in various embodiments, SPU 300 may be configured to perform operations that implement hash algorithms such as versions of the Secure Hash Algorithm (e.g., SHA-1, SHA-256, SHA-384, SHA-512), Message Digest 5 (MD5), and/or other hash algorithms. It is noted that SPU 300 may be alternately referred to as a cryptographic unit (although it is noted that SPU 300 may also implement non-cryptographic algorithms in addition to or instead of cryptographic algorithms). In various embodiments, SPU 300 may include various numbers of sub-units configured to implement the supported algorithms.

Owing to the complexity with which they transform their inputs, cryptographic algorithms such as ciphers or hashes tend to be considerably more computationally expensive than simple arithmetic operations such as addition. For example, cipher algorithms may iteratively perform a number of transformations on a block of input data to produce an encrypted output data block, where each transformation involves a number of operations.

In some embodiments, the functionality of a cryptographic algorithm may be implemented by standard arithmetic and logical instructions that may be provided by a processor's ISA. For example, a cipher algorithm such as DES may specify that an operand is to be permuted in a defined way, and/or that a defined substitution take place for all or a portion of the bits in an operand. Such permutation operations may be implemented using general-purpose ISA instructions by, for example, successively masking input bits (e.g., using a logical AND instruction), shifting the masked bits to their corresponding output positions (e.g., using logical shift or rotate instructions), and combining the shifted bits into the permuted result (e.g., using a logical OR instruction). Similarly, the substitution operations may be implemented by general-purpose ISA instructions as a sequence of conditional compare instructions, or as a lookup table in memory accessed via load instructions.

However, implementing a cryptographic algorithm using general-purpose ISA instructions may require numerous instructions as well as a substantial number of cycles to execute those instructions, diminishing execution performance. By contrast, in some embodiments, SPU 300 may be configured to provide support for certain ISA instructions that are particular to a specific cryptographic algorithm, such that execution of individual ones of the algorithm-specific instructions results in SPU 300 performing entire corresponding portions of a particular cryptographic algorithm such as a cipher. Thus, for at least some embodiments of SPU 300, executing the individual algorithm-specific instructions to implement the cryptographic algorithm may accomplish more of the work of the algorithm per instruction than in the case of using general-purpose ISA instructions configured to perform the algorithm.

To illustrate one example, in some embodiments, SPU 300 may be configured to perform different portions of the DES cipher, as defined by Federal Information Processing Standards (FIPS) Publication 46-3, in response to the issuance of DES-specific instructions for execution. As a general overview, the DES cipher is a block cipher that provides for the encryption and decryption of a 64-bit block of input data under the control of a 64-bit input key to produce a 64-bit block of output data. During operation, the DES cipher expands the 64-bit key into a set of 16 56-bit cipher keys (also referred to as a "key schedule"). To encrypt the input data block, the DES cipher first applies an initial permutation (IP) operation to the input data block, followed by 16 "rounds" or iterations of the cipher using the 16 keys of the key schedule. Finally, the DES cipher applies an inverse initial permutation operation (IIP) to the result of the final round to generate the encrypted data block. To perform decryption, the DES cipher applies same sequence of an IP operation and 16 cipher rounds followed by an IIP operation, but using the 16 keys of the key schedule in an inverse order relative to encryption.

To generate the key schedule from the 64-bit input key, the DES cipher applies a sequence of permutation and bitwise rotate operations to the input key. In the following discussion, consistent with the notation employed in FIPS 46-3, the most significant bit of a 64-bit data word is denoted bit 1, while the least significant bit is denoted bit 64. Although the input key is defined to be 64 bits wide, the DES cipher only employs 56 bits of the input key, omitting every eighth bit. In some implementations, the omitted bits may instead be used as parity bits to detect parity errors in the corresponding bytes of the input key.

Correspondingly, in some embodiments, SPU 300 may be configured to execute a DES key expansion instruction defined within the ISA of processor 10 and denoted with the instruction mnemonic DES_KEXPAND (though any suitable mnemonic may be employed). In various embodiments, SPU 300 may directly decode the DES_KEXPAND instruction from opcode bits sent from upstream pipeline stages, or may receive an already-decoded or partially-decoded signal indicative of the occurrence of a DES_KEXPAND instruction. In response to issuance of the DES_KEXPAND instruction, SPU 300 may be configured to generate one or more keys according to the key schedule defined by the DES cipher.

Similarly, in some embodiments, SPU 300 may be configured to execute a DES initial permutation instruction, a DES round instruction, and a DES inverse initial permutation instruction, each defined within the ISA of processor 10 and respectively denoted with the instruction mnemonics DES_IP, DES_ROUND, and DES_IIP (though any suitable mnemonics may be employed). In various embodiments, SPU 300 may directly decode these instructions from opcode bits sent from upstream pipeline stages, or may receive already-decoded or partially-decoded signals indicative of the occurrence of any of these instructions. (In other embodiments, some or all of these instructions may be implemented by distinct units within SPU 300 according to suitable combinations.) In response to issuance of the DES_IP, DES_ROUND, and DES_IIP instructions, SPU 300 may be configured to apply the DES initial permutation function, compute one or more rounds of the DES cipher, and apply the DES inverse initial permutation function, respectively.

One example of SPARC assembly language code that reflects usage of the DES_IP and DES_IIP instructions and an embodiment of the DES_ROUND instruction that performs two cipher rounds per invocation is as follows:

```
!# Expanded keys in F0 thru F30
setx     cleartext, %g1, %14
ldd      [%14 + 0x000], %f32      !# Load 64-bit cleartext
run_cipher:
des_ip     %f32,                %f32
des_round  %f0  , %f2  , %f32,  %f32   !# Rounds  1 and  2
des_round  %f4  , %f6  , %f32,  %f32   !# Rounds  3 and  4
des_round  %f8  , %f10 , %f32,  %f32   !# Rounds  5 and  6
des_round  %f12 , %f14 , %f32,  %f32   !# Rounds  7 and  8
des_round  %f16 , %f18 , %f32,  %f32   !# Rounds  9 and 10
des_round  %f20 , %f22 , %f32,  %f32   !# Rounds 11 and 12
des_round  %f24 , %f26 , %f32,  %f32   !# Rounds 13 and 14
des_round  %f28 , %f30 , %f32,  %f32   !# Rounds 15 and 16
des_iip    %f32,                %f32
```

In this example, it is assumed that the DES key schedule has already been generated and stored within 64-bit floating-point registers %f0 through %f30. The first two instructions load the 64-bit input block to be encrypted into floating-point register %f32. SPU 300 may be configured to execute the DES_IP instruction to apply the IP operation to register %f32, and may be further configured to execute the DES_ROUND instructions using the specified keys from the key schedule (or intermediate values that are precursors to such keys) to compute one pair of DES rounds per instruction. Finally, SPU 300 may be configured to execute the DES_IIP instruction to apply the IIP operation to register %32, which then contains the 64-bit encrypted output block. It is noted that this code represents merely one example of how the DES_IP, DES_IIP, and DES_ROUND instructions may be employed, and that numerous other applications using other variants of these instructions are possible and contemplated. For example, in other embodiments, these instructions may be implemented to use the integer register file instead of the floating-point register file. Further, these instructions may be implemented in any suitable ISA.

It is noted that although the DES cipher will be used as a recurring example, the techniques discussed herein apply generally to any type of cryptographic algorithm. In various embodiments, SPU 300 may be configured to implement algorithm-specific instruction support for any of a number of different cryptographic algorithms. Further details and examples regarding some such embodiments may be found in U.S. patent application Ser. No. 12/415,403, filed Mar. 31, 2009 and entitled "PROCESSOR AND METHOD FOR IMPLEMENTING INSTRUCTION SUPPORT FOR HASH ALGORITHMS," as well as U.S. patent application Ser. No. 12/414,755, filed Mar. 31, 2009 and entitled "PROCESSOR AND METHOD FOR IMPLEMENTING INSTRUCTION SUPPORT FOR THE DATA ENCRYPTION STANDARD (DES) ALGORITHM," each of which is hereby incorporated by reference in its entirety.

Operand Bypassing Considerations in Pipelined Processors

In the DES code example shown above, successive instructions each depend on the result of a previous instruction to be provided as an input operand (in this case, register %f32). However, in a pipelined processor, it may take a number of execution cycles before a result of one instruction is written into a register file from which it may be read by a successive, dependent instruction. One example of such a delay is illustrated in the pipeline diagram shown in FIG. 4. In the illustrated embodiment, there is a three-cycle delay between the time a result is produced and the time a subsequent dependent instruction can execute using result data read from a register file (though in other embodiments, an execution pipeline may employ a different writeback latency, different numbers of stages, and/or different stage definitions than those shown in FIG. 4).

Thus, in the illustrated pipeline, a result is produced by an executing instruction during cycle 1, and four instructions that are dependent upon this result are shown entering the execute stage during each of cycles 2-5. As shown, during cycle 2, the original result is in transit between the functional unit that produced it and the register file into which it will be stored. For example, such a delay may be necessary to account for the distance the result has to travel to reach the register file, and the consequent wire delay. During cycle 3, the result is written to the register file, such that it may be read at the end of cycle 3. During cycle 4, the result is read from the register file and transmitted back to the functional unit that will consume the result as an operand during the execute stage in cycle 5.

For this pipeline configuration, it is evident that cycle 5 is the earliest cycle in which a dependent instruction may execute if it reads a value from the register file that was produced during cycle 1. Thus, dependent instructions 1-3 will not be able to read from the register file and still execute in cycles 2-4 as shown. In some embodiments, such instructions might stall (i.e., be held) in the pipeline until their operands become available. However, such stalling may create delays that unacceptably degrade performance. As an alternative, a bypass network may be employed to make execution results available earlier than they would be available from the register file.

Figure 5:
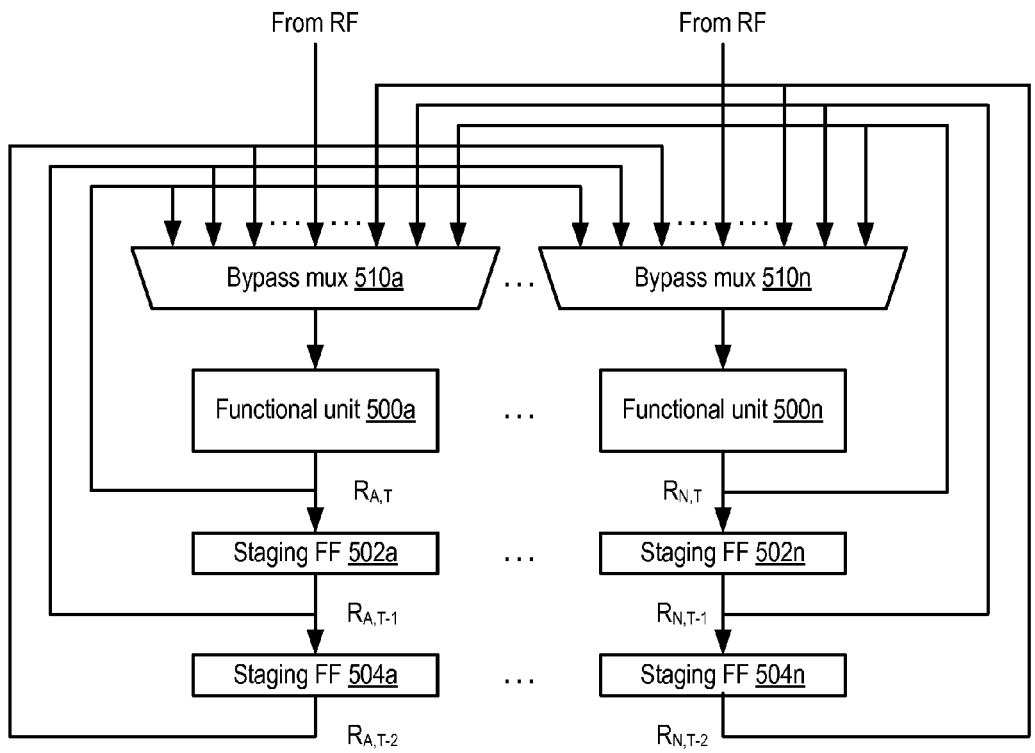
FIG. 5 is a block diagram illustrating an embodiment of a bypass network.

FIG. 5 illustrates an example embodiment of a bypass network. In the illustrated embodiment, several functional units 500a-n are shown. Functional units 500a-n may be referred to generically in the singular or plural as functional unit(s) 500, and may be alternatively referred to as execution units. The precise number of units may varying according to various embodiments. Each of functional units 500a-n may correspond to a unit that is configured to receive one or more operands, execute instructions, and produce one or more results. For example, respective ones of functional units 500 may correspond to each of execution units 235-240, load/store unit 245, and FGU 255, as shown in FIG. 2.

In the illustrated embodiment, for each of functional units 500a-n, two corresponding staging flip-flops (FFs) 502a-n and 504a-n are provided. These elements may be configured to stage, or delay, the result produced by functional units 500a-n so that results produced in earlier cycles may be preserved for use in subsequent cycles. In various embodiments, staging FFs 502 and 504 may be configured using any suitable type of state element, such as a flip-flip, latch, register, or other element configurable to store an input value for one or more execution cycles. Staging FFs 502 and 504 may be level-triggered, edge-triggered, or controlled in any other suitable fashion. In FIG. 5, the staged outputs of functional unit 510a are denoted $R_{A,T}$, $R_{A,T-1}$, $R_{A,T-2}$, and the staged outputs of functional unit 510n are denoted $R_{N,T}$, $R_{N,T-1}$, $R_{N,T-2}$. Thus, at some cycle T, the currently-produced result of functional unit 510a is available directly from that unit as $R_{A,T}$, while the results produced one and two cycles previously are respectively available from staging FFs 502a and 504a as $R_{A,T-1}$ and $R_{A,T-2}$.

Additionally, for each of functional units 500a-n, a corresponding bypass multiplexer (or mux) 510a-n is shown. In some embodiments, each functional unit 500 may have multiple bypass muxes 510: one for each functional unit input that is capable of being driven by the output of some other functional unit 500. Thus, a functional unit 500 having two or three operand inputs may have two or three instances of bypass muxes 510 corresponding to those inputs. For simplicity of illustration, however, only one mux per functional unit 500 is shown in FIG. 5.

As shown in FIG. 5, each bypass mux 510 may select from a number of inputs: the staged outputs of the functional unit 500 to which its output is coupled, the staged outputs of the other functional units 500 that are capable of bypassing a result, and the register file. By generating staged versions of prior results, storing them relatively close to the functional unit 500 (e.g., relative to the location of the register file) and presenting them to bypass mux 510 for selection, operands may be provided to dependent instructions without incurring the latency of obtaining those operands from the register file.

Figure 4:
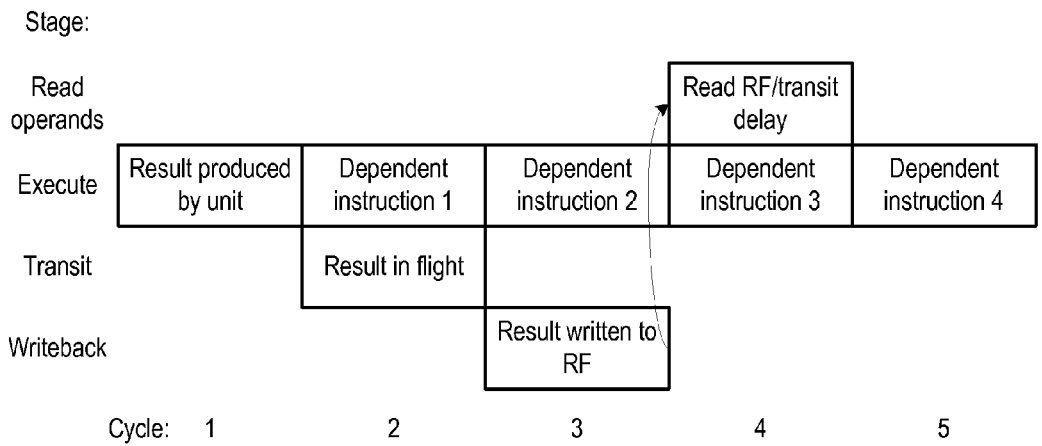
FIG. 4 is a pipeline diagram illustrating relationships among instructions having operand dependencies.

For example, assuming the bypass network of FIG. 5 is implemented in a processor having the pipeline shown in FIG. 4, and supposing each of the four dependent instructions and the original instruction execute in functional unit 500a, then at the end of cycle 1, the result of the original instruction may be available at the output of functional unit 500a as result $R_{A,T}$. This result may then be selected by bypass mux 510 to be supplied as an input to dependent instruction 1. Similarly, at the end of cycles 2 and 3, the result of the original instruction may be available at the output of staging FFs 402a and 404a as results $R_{A,T-1}$ and $R_{A,T-2}$, respectively. At the end of cycle 2, result $R_{A,T-1}$ may be selected by bypass mux 510 as an input to dependent instruction 2. Likewise, at the end of cycle 3, result $R_{A,T-2}$ may be selected by bypass mux 510 as an input to dependent instruction 3. As previously discussed, by the time dependent instruction 4 executes, the result of the original instruction may be available from the register file, and bypass mux 510 may select that input accordingly.

Operand Bypassing and Pipelining for Cryptographic Operations

Adding new, algorithm-specific cryptographic instructions to an existing ISA may present a number of implementation challenges with respect to the design of core 100. In some embodiments, a dedicated functional unit such as SPU 300 may be added alongside other existing functional units, such as execution units 235-240, LSU 245, and FGU 255. In such embodiments, the cryptographic instructions may issue to the cryptographic functional unit for execution in the same manner as other types of instructions issue to other functional units. However, adding an additional, independent functional unit to the existing functional units may bring associated costs.

For example, during any given execution cycle, each functional unit may be capable of generating a result to be written back to the register file. To avoid delays associating with arbitrating for access, the register file may implement a dedicated write port for each result producer (e.g., one write port per functional unit). Thus, adding an additional result producer for cryptographic instructions may necessitate adding an additional write port to the register file. Because the amount of register file state may be considerable, especially in a multithreaded machine, adding a write port may have a nontrivial impact on the area of the register file.

Additionally, as noted above, the complexity of the bypass network is generally a function of the number of result producers and the number of input operands of producers that can consume operands generated by other producers. If an additional functional unit is added as an independent producer of cryptographic instruction results, then it may be necessary to add a number of additional bypass result buses from the added functional unit to the other functional units, as well as to extend the result buses from the existing functional units to the added functional unit. For example, for the bypass network shown in FIG. 5, adding an additional functional unit 500 may result in adding three additional buses to route the staged results of the new unit.

An alternative approach to adding cryptographic instruction functionality within a separate functional unit would be to integrate that functionality within an existing functional unit. For example, an existing functional unit configured to execute certain types of instructions could be augmented to execute new cryptographic instructions. This approach may avoid increasing the number of result producers, because an existing producer is being used for the new functionality. Thus, the register file and bypass network complications noted above may be avoided by this approach.

However, this alternative may present its own challenges. In some instances, the execution latencies of the cryptographic instructions to be added may make it infeasible to integrate such instructions within another functional unit that executes instructions with shorter latency or with variable latency. For example, owing to their complexity, cryptographic instructions may require multiple execution cycles to produce a result. By contrast, a functional unit configured to implement integer instructions (e.g., execution units 235-240) may be specifically designed to require fewer execution cycles (such as a single execution cycle). Further, a functional unit configured to implement load and store instructions (e.g., LSU 245) may experience variable execution latency in the event of a cache miss.

Integrating longer-latency cryptographic instructions within a shorter-latency or variable-latency execution unit may negatively affect the performance of either the cryptographic instructions or the instructions executed by the unit into which the cryptographic instructions are integrated. Alternatively, such combinations may considerably increase the complexity of the instruction scheduling logic needed to accommodate different combinations of instruction execution latencies.

Thus, it may be more feasible to integrate cryptographic instructions within a functional unit that has a longer execution latency than the cryptographic instructions. For example, in some embodiments, the floating point execution pipeline implemented by FGU 255 may be substantially longer than the pipeline required by the cryptographic instructions (e.g., 10-12 execution cycles for floating-point instructions, as opposed to, e.g., 2-5 execution cycles for cryptographic instructions). Thus, the cryptographic pipeline might "fit" within the floating-point pipeline without substantial disruption to instruction scheduling and result bypassing logic external to FGU 255.

However, simply extending the length of the cryptographic pipeline to match the longer latency of the unit into which the cryptographic instructions are implemented may seriously degrade the performance of those instructions. For example, consider an embodiment in which cryptographic instructions require 3 execution cycles, whereas the floating-point pipeline of FGU 255 requires 12 execution cycles. (These details are intended to convey only a particular scenario for the sake of exposition, and may of course vary for other embodiments without loss of generality.) For the DES cipher code example discussed above (involving a sequence of a DES_IP instruction, 8 DES_ROUND instructions, and a DES_IIP instruction), if each of the 10 instructions making up the cipher were to execute at their minimum latency and could bypass its results to a dependent instruction, the cipher could execute in a total of 30 cycles. However, if each of these instructions were required to execute through the full 12-cycle floating-point pipeline before its result was available to a dependent instruction, the cipher would require a total of 120 cycles.

Figure 6:
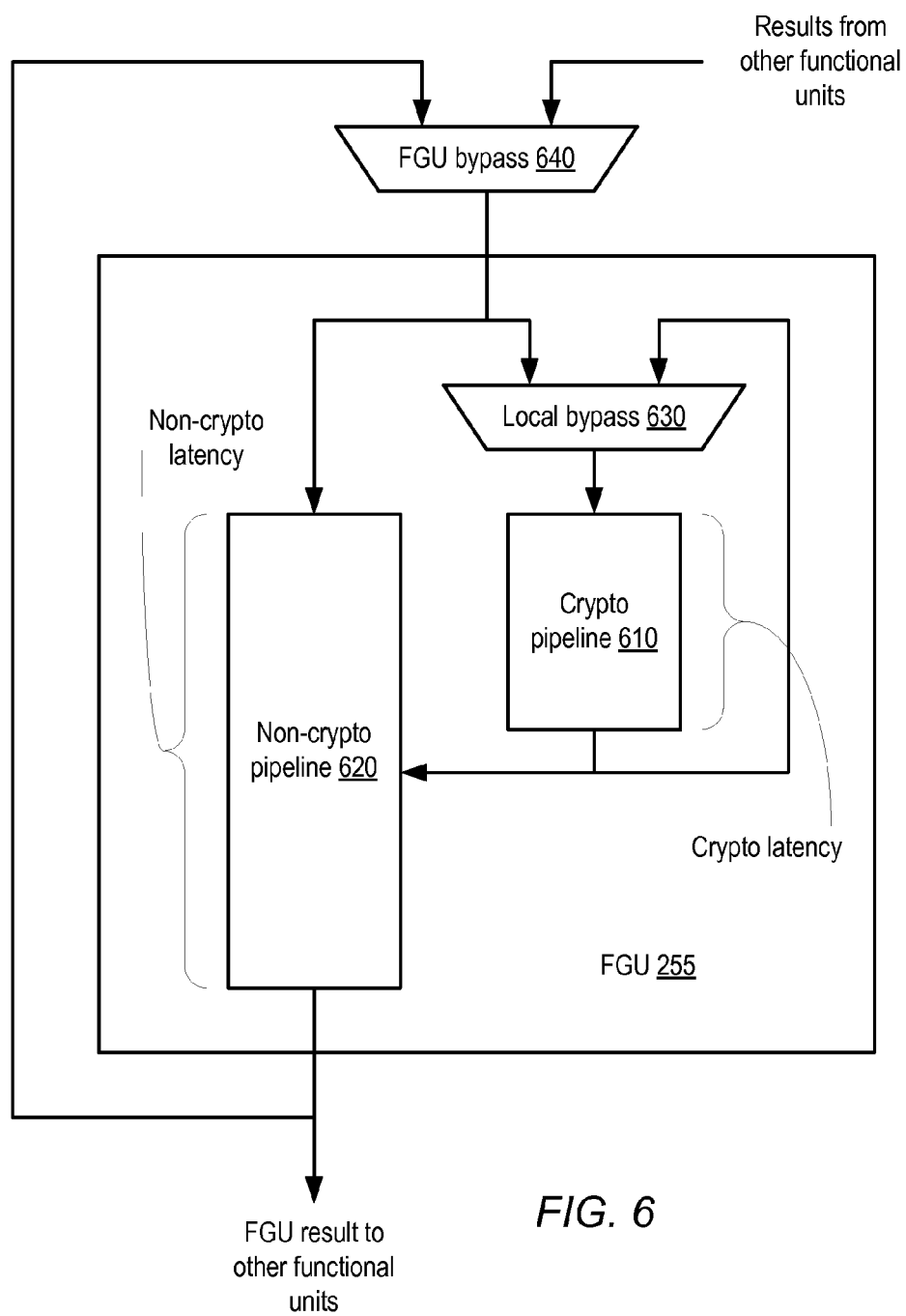
FIG. 6 is a block diagram illustrating an embodiment of a functional unit including a local bypass network.

The embodiment of FIG. 6 illustrates one example of an approach that attempts to minimize the various impacts discussed above. In the illustrated embodiment, FGU 255 includes a crypto pipeline 610, a non-crypto pipeline 620, and a local bypass network 630 as well as an FGU bypass network 640. In various embodiments, crypto pipeline 610 may correspond to a pipelined circuit configured to implement cryptographic instructions, while non-crypto pipeline 620 may correspond to a pipelined circuit configured to implement non-cryptographic instructions. The execution latency of crypto pipeline 610 may be shorter than the execution latency of non-crypto pipeline 620 (e.g., in terms of the number of execution cycles before the pipeline produces a final result usable by another instruction).

For example, crypto pipeline 610 may be configured to implement the functionality of all or a portion of SPU 300 discussed above. More specifically, crypto pipeline 610 may be configured to implement the functionality of the various cipher and hash-related algorithm-specific instructions that may be implemented by core 100. By contrast, non-crypto pipeline 620 may be configured to execute other types of instructions, such as floating point and/or graphics-related instructions. It is noted that in some embodiments, FGU 255 may include multiple instances of crypto pipeline 610 and/or non-crypto pipeline 620 that may have different configurations. For example, FGU 255 may implement different floating-point pipelines having different execution latencies for different types of floating-point instructions. In some embodiments, crypto pipeline 610 may have a latency of 3 cycles while non-crypto pipeline 620 has a latency of 12 cycles, corresponding to the example presented above. However, any combination of latencies may be employed.

In the illustrated embodiment, the execution of cryptographic instructions may be integrated into FGU 255, which is a functional unit that may already exist as a producer of results capable of being bypassed both with respect to FGU 255 and other functional units. That is, FGU 255 may be an example instance of functional units 500*a-n* as shown in FIG. 5. Thus, by integrating cryptographic instruction execution within an existing producer, it may be unnecessary to add additional register file write ports as well as additional buses to the bypass network, as might be the case if the functionality of crypto pipeline 610 were added as an independent producer.

As shown in FIG. 6, the output of crypto pipeline 610 may be merged into non-crypto pipeline 620 before being made available at the output of FGU 255. For example, non-crypto pipeline 620 may include multiplexer logic configured to insert the output of crypto pipeline 610 into the appropriate stage of non-crypto pipeline 620 (e.g., into stage M+1 of non-crypto pipeline 620 if crypto pipeline 610 has M stages, where each stage corresponds to an execution cycle). In an alternative embodiment, the output of crypto pipeline 610 may be staged through a number of staging flip-flops or other state elements (not shown) and merged with the output of non-crypto pipeline 620. In either case, when the result of crypto pipeline 610 follows this result path, it may be output from FGU 255 (and thus made available to other functional units, via a bypass network like that of FIG. 5) with the latency of non-crypto pipeline 620. Thus, for example, a cryptographic instruction that follows this result path may be available at the output of FGU 255 after 12 execution cycles, as with instructions that pass through non-crypto pipeline 620.

However, in the illustrated embodiment, FGU 255 includes a second result path from crypto pipeline 610 through local bypass network 630. This path may be configured such that crypto pipeline 610 may bypass a result to its own input earlier than if the result followed the path through non-crypto pipeline 620 as discussed above. But unlike the bypass paths illustrated in FIG. 5, local bypass network 630 may be configured such that the output produced by crypto pipeline 610 may only be bypassed to another cryptographic instruction executing in crypto pipeline 610, and not to a functional unit external to FGU 255. That is, local bypass network 630 may be available only to cryptographic instruction consumers of cryptographic instruction producers.

For simplicity of illustration, local bypass network 630 is shown in FIG. 6 as a single multiplexer. However, it is contemplated that in various embodiments, local bypass network 630 may include a number of staging flip-flops or other storage elements similar to those shown in FIG. 5, depending on the number of execution cycles local bypass network 630 is configured to cover. Additionally, multiple multiplexers and bypass buses may be employed in order to implement bypassing to any of the input operands used by crypto pipeline 610. For example, if crypto pipeline 610 employs three input operands, three distinct local bypass multiplexers may be implemented. In some embodiments, it is contemplated that the underlying physical structures of local bypass network 630 may be combined with structures of FGU bypass 640, without loss of generality. For example, a single level of multiplexers with a more complex decode might be employed instead of two levels of multiplexers.

Owing to the inclusion of a local bypass path, in the illustrated embodiment, the results of cryptographic instructions executing in crypto pipeline 610 may be available with two different latencies: they may be available to other cryptographic instructions executing within crypto pipeline 610 with the crypto pipeline latency, and they may be available to non-cryptographic instructions executing externally to crypto pipeline 610 (e.g., instructions executing within non-crypto pipeline 620 as well as instructions executing externally to FGU 255) with the non-crypto pipeline latency. Such a configuration may enable early bypassing of results within chains of dependent cryptographic instructions, thus avoiding imposing the longer latency of non-crypto pipeline 620 on such instructions). At the same time, it may confine the hardware impact of additional bypass buses to the vicinity of FGU 255, thus avoiding the costs of routing additional buses to the other functional units.

Figure 7:
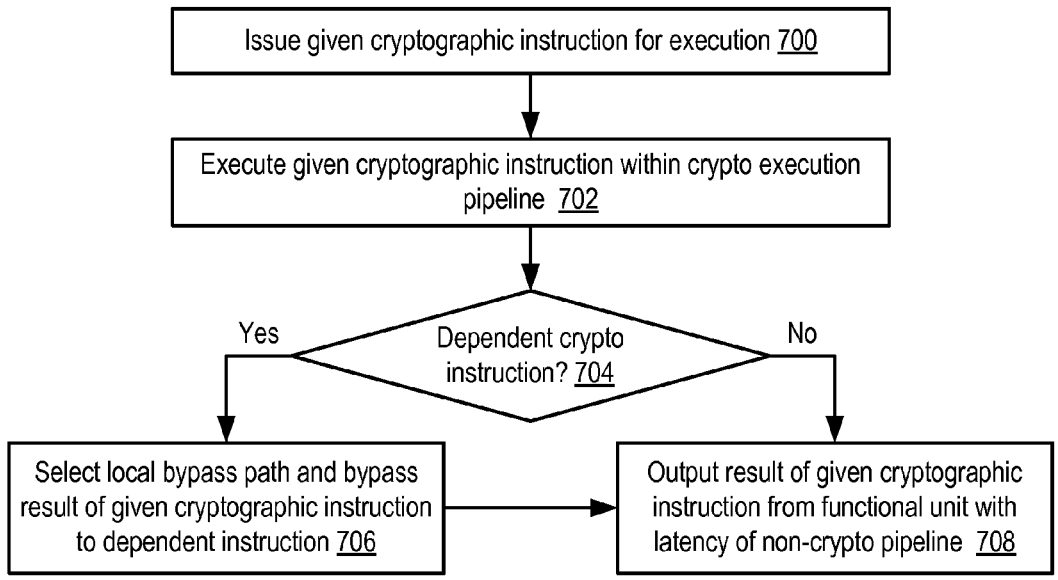
FIG. 7 is a flow diagram illustrating the operation of one embodiment of a processor including a local bypass network.

FIG. 7 illustrates one example of a method of operation of a functional unit configured to implement algorithm-specific cryptographic instructions with a local bypass network. For example, FIG. 7 may illustrate an example of the operation of FGU 255. Operation begins in block 700 where a given cryptographic instruction is issued to a functional unit for execution, where the functional unit includes both a crypto pipeline configured to execute cryptographic instructions and a non-cryptographic pipeline configured to execute non-cryptographic instructions, where the crypto pipeline has a shorter execution latency than the non-crypto pipeline. For example, one of the DES-specific instructions discussed above, or any other suitable type of cryptographic instruction, may be issued to FGU 255 by issue unit 230, where FGU 255 may include crypto pipeline 610 and non-crypto pipeline 620 as discussed above.

The given cryptographic instruction then executes within the crypto execution pipeline (block 702). For example, the issued instruction may execute within crypto pipeline 610 to the point where a result is produced.

The result path taken by the result of the given cryptographic instruction may depend on whether there exists a subsequent cryptographic instruction that is dependent upon the given cryptographic instruction (block 704). For example, in the DES cipher code example given above, each cryptographic instruction depends on the one that precedes it.

In response to detecting a dependent cryptographic instruction, the local bypass path is selected, and the result of the given cryptographic instruction is bypassed to the dependent instruction (block 706). The local bypassing may occur such that the result of the given cryptographic instruction is available to a dependent cryptographic instruction with the latency of the crypto pipeline, which is less than the latency of the non-crypto pipeline. Thus, for example, in an embodiment where cryptographic instructions execute with a 3-cycle latency and non-cryptographic instructions execute with a 12-cycle latency, dependent cryptographic instructions (such as the dependent instructions in the DES cipher example) may execute at the 3-cycle rate of the crypto pipeline rather than the 12-cycle rate of the non-crypto pipeline.

If there is no dependent cryptographic instruction (e.g., if there is a dependent non-cryptographic instruction, or no dependent instruction at all), the result of the given cryptographic instruction is output from the functional unit with the latency of the non-crypto pipeline (block 708). Thus, for example, if there exists a store instruction that is dependent upon the given cryptographic instruction, the result of the given cryptographic instruction may be made available from the output of FGU 255 after the full latency of non-crypto pipeline 620 (e.g., after 12 cycles, rather than 3). This result may then be bypassed, e.g., to LSU 245 for use by the dependent store instruction.

It is contemplated that in some embodiments, the result of the given cryptographic instruction may be available via both the local bypass path and the output of the functional unit, for example in the event that there exist both dependent cryptographic and non-cryptographic instructions. Thus, these paths need not be mutually exclusive. This possibility is shown in FIG. 7 by the progression of block 706 to block 708, illustrating that an instruction for which the local bypass path is selected may also be output from the functional unit. For example, even in the case where local bypassing occurs, the results of cryptographic instructions that execute in crypto pipeline 610 may be written back to architecturally-visible state to facilitate the handling of interrupts. Such results may thus follow both the local bypass path and the functional unit output. However, in other embodiments, it is contemplated that a result that follows the local bypass path need not be output from the functional unit, e.g., in embodiments where fine-grained interrupt/exception handling is not needed for instructions that execute in crypto pipeline 610.

In some embodiments, the detection of dependent cryptographic and non-cryptographic instructions may occur before instructions are issued to functional units for execution. For example, dependency detection may occur during instruction decode (e.g., by decode unit 215), or at another stage prior to issue. In some such embodiments, whether the dependent instruction is a cryptographic instruction that depends on an earlier cryptographic instruction may be detected at this stage, and state corresponding to the dependent instruction may be stored to reflect selection of the local bypass path. For example, a trigger bit associated with the instruction (or with particular operands of the instruction) may be set during the decode stage. When the instruction ultimately is issued for execution, the trigger bit may indicate whether the instruction should obtain a value from the local bypass path or from a different source. Generally, however, any suitable technique for controlling the selection of a local bypass path for a dependent cryptographic instruction may be employed.

Further improvements in cryptographic instruction performance may be made to some embodiments of crypto pipeline 610. For example, one common mode of operation of block cipher algorithms such as DES, AES, etc., is "chaining mode," in which the encryption of one data block depends on the encrypted version of another data block. For example, in the cipher block chaining (CBC) mode of operation, for a sequence of N data blocks denoted 0 through N−1, then for each data block K (where K ranges from 1 to N−1), prior to being encrypted, the cleartext (i.e., unencrypted) version of data block K is first combined with the encrypted version of data block K−1 using a chaining operation. In some embodiments, the chaining operation may be defined as a logical XOR operation, though other chaining operations may also be employed.

In some embodiments, other chaining modes of operation may also be implemented. Such other modes may include, for example and without limitation, the propagating cipher block chaining (PCBC) mode, the cipher feedback (CFB) mode, the output feedback (OFB) mode, or the counter (CTR) mode. Generally speaking, chaining modes may have the common property that the results of one block encryption operation are used in some other block encryption operation by virtue of some type of chaining operation.

Consider an instance in which the chaining operation is implemented as one or more instructions that execute externally to crypto pipeline 610. For example, to implement the DES cipher discussed above with the CBC mode, in some embodiments the chaining operation may be implemented by a single FXOR instruction (i.e., a logical XOR instruction that is configured to execute within FGU 255, as opposed to within one of the integer execution units). As noted above, in some embodiments of FGU 255, non-cryptographic instructions may execute with the latency of the non-crypto pipeline 620, and cryptographic instructions that feed dependent non-cryptographic instructions may also execute with this longer latency. For purposes of this example, the 3-cycle crypto and 12-cycle non-crypto latencies discussed above will be employed, though any other values may be used.

Given these assumptions, in some embodiments, DES encryption of the first data block may take 30+9 execution cycles—as noted above, each of the 10 instructions making up the DES cipher may execute in 3 cycles, but because the final instruction of the DES cipher feeds a non-cryptographic instruction (the FXOR chaining operation), this instruction may take the full 12 cycles of non-crypto pipeline 620 before its result is available. Then, the chaining FXOR instruction may execute in 12 cycles in non-crypto pipeline 620. Thus, in such embodiments, each pair of block encryption and chaining operations may require 51 execution cycles to complete.

In some embodiments, the latency associated with chaining may be reduced by implementing the chaining operations as cryptographic instructions that execute within crypto pipeline 610, and thus may take advantage of local bypass network 630. For example, the FXOR instruction (or in some embodiments, several or all of the floating-point logical/Boolean instructions that may be defined by the ISA, such as floating-point AND, OR, NOT, shift, rotate, or any other logical or Boolean instruction) may be implemented by crypto pipeline 610, such that even when not being used in the context of a cryptographic algorithm, these instructions may execute within crypto pipeline 610 with its shorter latency.

Implementing chaining operations as instructions having access to local bypass network 630 may substantially reduce execution times for chaining-mode ciphers. Revisiting the DES example, the 10 instructions of the DES cipher may take 30 execution cycles. But because the chaining FXOR is implemented within crypto pipeline 610, the last instruction of the DES cipher may bypass its result to the chaining FXOR using the local bypass path, without paying the additional 9 cycle penalty to fall to the bottom of non-crypto pipeline 620. Further, the chaining FXOR may execute in 3 cycles, and may bypass its result to the next instance of the DES cipher via the local bypass path. Thus, in this example, each pair of block encryption and chaining operations may take 33 execution cycles to complete, which is a 35% reduction from the 51 cycles of the previous example.

Example System Embodiment

Figure 8:
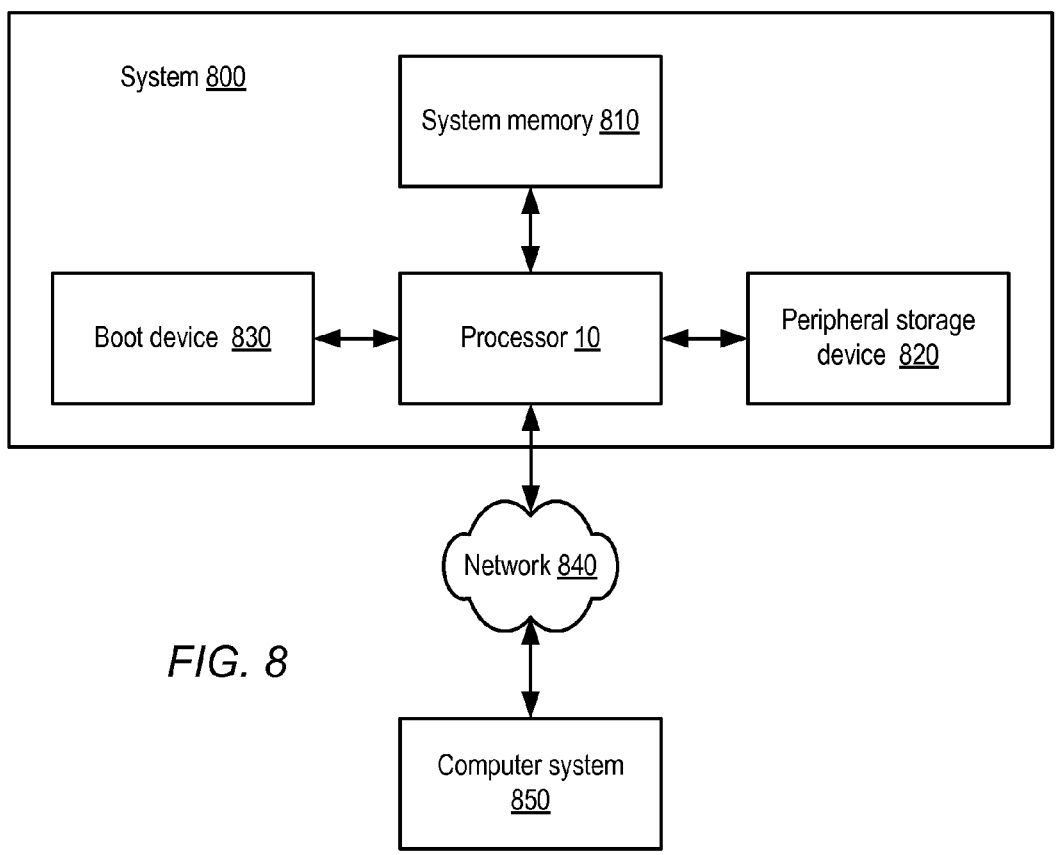
FIG. 8 is a block diagram illustrating an embodiment of a system including a multithreaded processor.

As described above, in some embodiments, processor 10 of FIG. 1 may be configured to interface with a number of external devices. One embodiment of a system including processor 10 is illustrated in FIG. 8. In the illustrated embodiment, system 800 includes an instance of processor 10, shown as processor 10*a*, that is coupled to a system memory 810, a peripheral storage device 820 and a boot device 830. System 800 is coupled to a network 840, which is in turn coupled to another computer system 850. In some embodiments, system 800 may include more than one instance of the devices shown. In various embodiments, system 800 may be configured as a rack-mountable server system, a standalone system, or in any other suitable form factor. In some embodiments, system 800 may be configured as a client system rather than a server system.

In some embodiments, system 800 may be configured as a multiprocessor system, in which processor 10*a* may optionally be coupled to one or more other instances of processor 10, shown in FIG. 8 as processor 10*b*. For example, processors 10*a-b* may be coupled to communicate via their respective coherent processor interfaces 140.

In various embodiments, system memory 810 may comprise any suitable type of system memory as described above, such as FB-DIMM, DDR/DDR2/DDR3/DDR4 SDRAM, or RDRAM®, for example. System memory 810 may include multiple discrete banks of memory controlled by discrete memory interfaces in embodiments of processor 10 that provide multiple memory interfaces 130. Also, in some embodiments, system memory 810 may include multiple different types of memory.

Peripheral storage device 820, in various embodiments, may include support for magnetic, optical, or solid-state storage media such as hard drives, optical disks, nonvolatile RAM devices, etc. In some embodiments, peripheral storage device 820 may include more complex storage devices such as disk arrays or storage area networks (SANs), which may be coupled to processor 10 via a standard Small Computer System Interface (SCSI), a Fibre Channel interface, a Firewire® (IEEE 1394) interface, or another suitable interface. Additionally, it is contemplated that in other embodiments, any other suitable peripheral devices may be coupled to processor 10, such as multimedia devices, graphics/display devices, standard input/output devices, etc. In one embodiment, peripheral storage device 820 may be coupled to processor 10 via peripheral interface(s) 150 of FIG. 1.

As described previously, in one embodiment boot device 830 may include a device such as an FPGA or ASIC configured to coordinate initialization and boot of processor 10, such as from a power-on reset state. Additionally, in some embodiments boot device 830 may include a secondary computer system configured to allow access to administrative functions such as debug or test modes of processor 10.

Network 840 may include any suitable devices, media and/or protocol for interconnecting computer systems, such as wired or wireless Ethernet, for example. In various embodiments, network 840 may include local area networks (LANs), wide area networks (WANs), telecommunication networks, or other suitable types of networks. In some embodiments, computer system 850 may be similar to or identical in configuration to illustrated system 800, whereas in other embodiments, computer system 850 may be substantially differently configured. For example, computer system 850 may be a server system, a processor-based client system, a stateless "thin" client system, a mobile device, etc. In some embodiments, processor 10 may be configured to communicate with network 840 via network interface(s) 160 of FIG. 1.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A processor, comprising:
a hardware instruction fetch unit configured to issue instructions for execution, wherein the instructions are programmer-selectable from a defined instruction set architecture (ISA); and
a hardware functional unit configured to receive instructions for execution from the instruction fetch unit, wherein the instructions include one or more cryptographic instructions and one or more non-cryptographic instructions, wherein the hardware functional unit comprises:
a cryptographic execution pipeline configured to execute the one or more cryptographic instructions with a corresponding cryptographic execution latency;
a non-cryptographic execution pipeline configured to execute the one or more non-cryptographic instructions with a corresponding non-cryptographic execution latency that is longer than the cryptographic execution latency; and
a local bypass network circuit comprising one or more multiplexers, wherein the local bypass network circuit is coupled to an output of the cryptographic execution pipeline and one or more inputs of the cryptographic execution pipeline and is configured to bypass results produced by the cryptographic execution pipeline to dependent cryptographic instructions executing within the cryptographic execution pipeline without routing such bypassed results externally to the hardware functional unit, such that each instruction within a sequence of dependent cryptographic instructions is executable with an execution latency corresponding to the cryptographic execution latency, and wherein the local bypass network circuit is not electrically coupled to bypass the results of the cryptographic execution pipeline to any other functional unit within the processor.

2. The processor as recited in claim 1, wherein the hardware functional unit is further configured to supply results produced by the cryptographic execution pipeline to dependent non-cryptographic instructions with an execution latency corresponding to the non-cryptographic execution latency, such that an execution latency of a given cryptographic instruction from the perspective of a given dependent instruction depends upon whether the given dependent instruction is a cryptographic instruction or a non-cryptographic instruction.

3. The processor as recited in claim 1, further comprising a bypass network configured to bypass results produced by the hardware functional unit to other ones of a plurality of functional units that includes the hardware functional unit, wherein results produced by the cryptographic execution pipeline are available for bypass to other functional units with an execution latency corresponding to the non-cryptographic execution latency.

4. The processor as recited in claim 1, wherein the one or more cryptographic instructions include an instruction that is executable within the cryptographic execution pipeline to perform one or more rounds of a block cipher.

5. The processor as recited in claim 1, wherein the one or more cryptographic instructions include a chaining instruction that is executable within the cryptographic execution pipeline to perform a chaining operation with respect to blocks of a block cipher.

6. The processor as recited in claim 5, wherein the hardware functional unit is configured to perform floating-point arithmetic and wherein the chaining instruction is a floating-point logical XOR instruction.

7. The processor as recited in claim 6, wherein the cryptographic execution pipeline is configured to execute all floating-point logical instructions defined within the ISA, and wherein all floating-point arithmetic instructions defined within the ISA are executable by the non-cryptographic execution pipeline or another pipeline distinct from the cryptographic execution pipeline.

8. A method, comprising:
issuing instructions for execution by a hardware processor, wherein the instructions are programmer-selectable from a defined instruction set architecture (ISA);
receiving instructions within a hardware functional unit of the processor for execution, wherein the instructions include one or more cryptographic instructions and one or more non-cryptographic instructions;
executing the one or more cryptographic instructions in a cryptographic execution pipeline of the hardware functional unit with a corresponding cryptographic execution latency;

executing the one or more non-cryptographic instructions in a non-cryptographic execution pipeline of the hardware functional unit with a corresponding non-cryptographic execution latency that is longer than the cryptographic execution latency; and bypassing results produced by the cryptographic execution pipeline to dependent cryptographic instructions executing within the cryptographic execution pipeline through a local bypass network circuit of the hardware functional unit comprising one or more multiplexers, wherein the local bypass network circuit is coupled to an output of the cryptographic execution pipeline and one or more inputs of the cryptographic execution pipeline, and wherein said bypassing occurs without routing such bypassed results externally to the hardware functional unit such that each instruction within a sequence of dependent cryptographic instructions executes with an execution latency corresponding to the cryptographic execution latency, and wherein the local bypass network circuit is not electrically coupled to bypass the results of the cryptographic execution pipeline to any other functional unit within the processor.

9. The method as recited in claim 8, further comprising:
supplying results produced by the cryptographic execution pipeline to dependent non-cryptographic instructions with an execution latency corresponding to the non-cryptographic execution latency, such that an execution latency of a given cryptographic instruction from the perspective of a given dependent instruction depends upon whether the given dependent instruction is a cryptographic instruction or a non-cryptographic instruction.

10. The method as recited in claim 8, further comprising:
bypassing results produced by the hardware functional unit via the bypass network to other ones of a plurality of functional units that includes the hardware functional unit, wherein results produced by the cryptographic execution pipeline are bypassed to other functional units with an execution latency corresponding to the non-cryptographic execution latency.

11. The method as recited in claim 8, wherein the one or more cryptographic instructions include an instruction that is executable within the cryptographic execution pipeline to perform one or more rounds of a block cipher.

12. The method as recited in claim 8, wherein the one or more cryptographic instructions include a chaining instruction that is executable within the cryptographic execution pipeline to perform a chaining operation with respect to blocks of a block cipher.

13. The method as recited in claim 12, wherein the hardware functional unit is configured to perform floating-point arithmetic and wherein the chaining instruction is a floating-point logical XOR instruction.

14. The method as recited in claim 13, wherein the cryptographic execution pipeline is configured to execute all floating-point logical instructions defined within the ISA, and wherein all floating-point arithmetic instructions defined within the ISA are executable by the non-cryptographic execution pipeline or another pipeline distinct from the cryptographic execution pipeline.

15. A system, comprising:
a system memory; and
a processor coupled to the system memory, wherein the processor comprises:
a hardware instruction fetch unit configured to issue instructions for execution, wherein the instructions are programmer-selectable from a defined instruction set architecture (ISA); and
a hardware functional unit configured to receive instructions for execution from the instruction fetch unit, wherein the instructions include one or more cryptographic instructions and one or more non-cryptographic instructions, wherein the hardware functional unit comprises:
a cryptographic execution pipeline configured to execute the one or more cryptographic instructions with a corresponding cryptographic execution latency;
a non-cryptographic execution pipeline configured to execute the one or more non-cryptographic instructions with a corresponding non-cryptographic execution latency that is longer than the cryptographic execution latency; and
a local bypass network circuit comprising one or more multiplexers, wherein the local bypass network circuit is coupled to an output of the cryptographic execution pipeline and one or more inputs of the cryptographic execution pipeline and is configured to bypass results produced by the cryptographic execution pipeline to dependent cryptographic instructions executing within the cryptographic execution pipeline without routing such bypassed results externally to the hardware functional unit, such that each instruction within a sequence of dependent cryptographic instructions is executable with an execution latency corresponding to the cryptographic execution latency, and wherein the local bypass network circuit is not electrically coupled to bypass the results of the cryptographic execution pipeline to any other functional unit within the processor.

16. The system as recited in claim 15, wherein the hardware functional unit is further configured to supply results produced by the cryptographic execution pipeline to dependent non-cryptographic instructions with an execution latency corresponding to the non-cryptographic execution latency, such that an execution latency of a given cryptographic instruction from the perspective of a given dependent instruction depends upon whether the given dependent instruction is a cryptographic instruction or a non-cryptographic instruction.

17. The system as recited in claim 15, further comprising a bypass network configured to bypass results produced by the hardware functional unit to other ones of a plurality of functional units that includes the hardware functional unit, wherein results produced by the cryptographic execution pipeline are available for bypass to other functional units with an execution latency corresponding to the non-cryptographic execution latency.

18. The system as recited in claim 15, wherein the one or more cryptographic instructions include an instruction that is executable within the cryptographic execution pipeline to perform one or more rounds of a block cipher.

19. The system as recited in claim 15, wherein the one or more cryptographic instructions include a chaining instruction that is executable within the cryptographic execution pipeline to perform a chaining operation with respect to blocks of a block cipher.

20. The system as recited in claim 15, wherein the cryptographic execution pipeline is configured to execute all floating-point logical instructions defined within the ISA, and wherein all floating-point arithmetic instructions defined within the ISA are executable by the non-cryptographic execution pipeline or another pipeline distinct from the cryptographic execution pipeline.

* * * * *